(12) United States Patent
Bertken

(10) Patent No.: US 12,512,683 B2
(45) Date of Patent: *Dec. 30, 2025

(54) CHARGING HOLSTER AND FLASHLIGHT

(71) Applicant: Infinity X1 LLC, Carlsbad, CA (US)

(72) Inventor: Dennis K. Bertken, Carlsbad, CA (US)

(73) Assignee: Infinity X1 LLC, Carlsbad, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/078,137

(22) Filed: Mar. 12, 2025

(65) Prior Publication Data

US 2025/0379462 A1    Dec. 11, 2025

Related U.S. Application Data

(63) Continuation of application No. 18/737,909, filed on Jun. 7, 2024, now Pat. No. 12,255,477.

(51) Int. Cl.
| | |
|---|---|
| *H01M 10/46* | (2006.01) |
| *F21L 4/08* | (2006.01) |
| *H02J 7/00* | (2006.01) |

(52) U.S. Cl.
CPC .............. *H02J 7/0044* (2013.01); *F21L 4/08* (2013.01); *H02J 7/0047* (2013.01)

(58) Field of Classification Search
CPC ......... F21L 4/08; H02J 7/0047; H02J 7/0044; H02J 7/0042

USPC ......... 320/107, 114, 115, 132, 149, DIG. 18, 320/DIG. 19; 362/109, 120, 183, 202

See application file for complete search history.

(56) References Cited

U.S. PATENT DOCUMENTS

| | | |
|---|---|---|
| 10,234,084 B2 | 3/2019 | Purkiss |
| 12,255,477 B1 * | 3/2025 | Bertken ................... F21L 4/08 |
| 2008/0284374 A1 | 11/2008 | Gardner et al. |
| 2016/0268827 A1 | 9/2016 | Ziegenfuss et al. |

FOREIGN PATENT DOCUMENTS

CA          2244215 A1    2/1999

* cited by examiner

*Primary Examiner* — Edward Tso
(74) *Attorney, Agent, or Firm* — Wang Hardoon, P.C.

(57) ABSTRACT

A flashlight with a holster charging system is disclosed. A charging holster may provide powered storage for the flashlight and provide extra power for use in other devices such as headlamps. The holster may attach, via a clip, onto the belt, pocket, or bag of a user so they may carry the flashlight while the flashlight recharges. A user may be able to use the flashlight while charging the flashlight in the holster. The holster may have an aperture for an attached flashlight to shine through while electrically coupled to the holster. Charging contacts on the charging holster may be configured to contact charging rings on the flashlight to couple the flashlight to charging circuitry. Power and mode buttons at the rear of the flashlight may enable the flashlight to be powered and operational mode changed on while holstered no matter the orientation the flashlight in the holster.

20 Claims, 14 Drawing Sheets

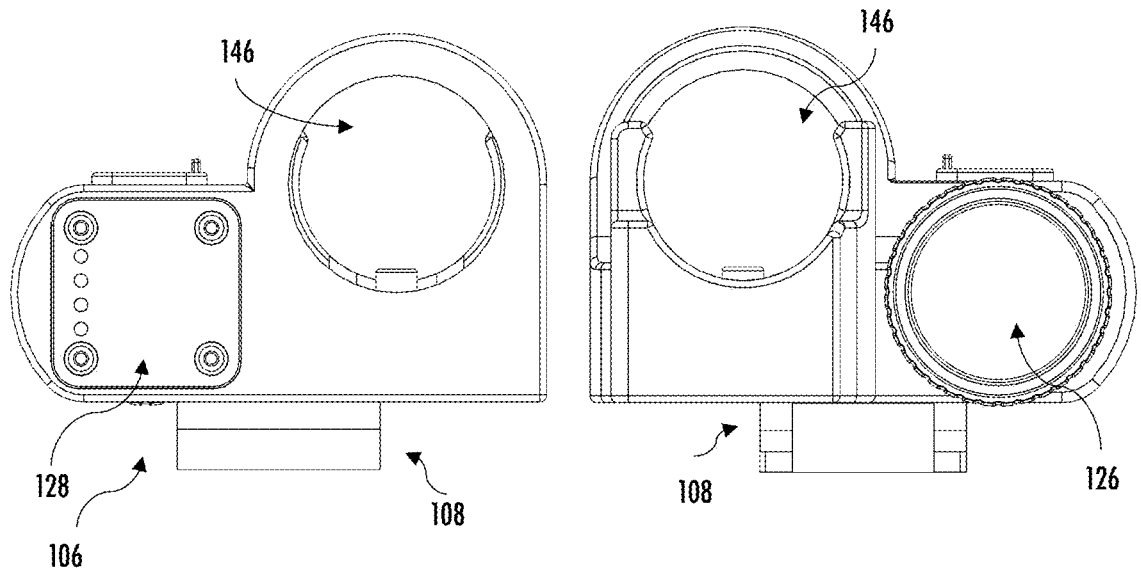
FIG. 4     FIG. 5
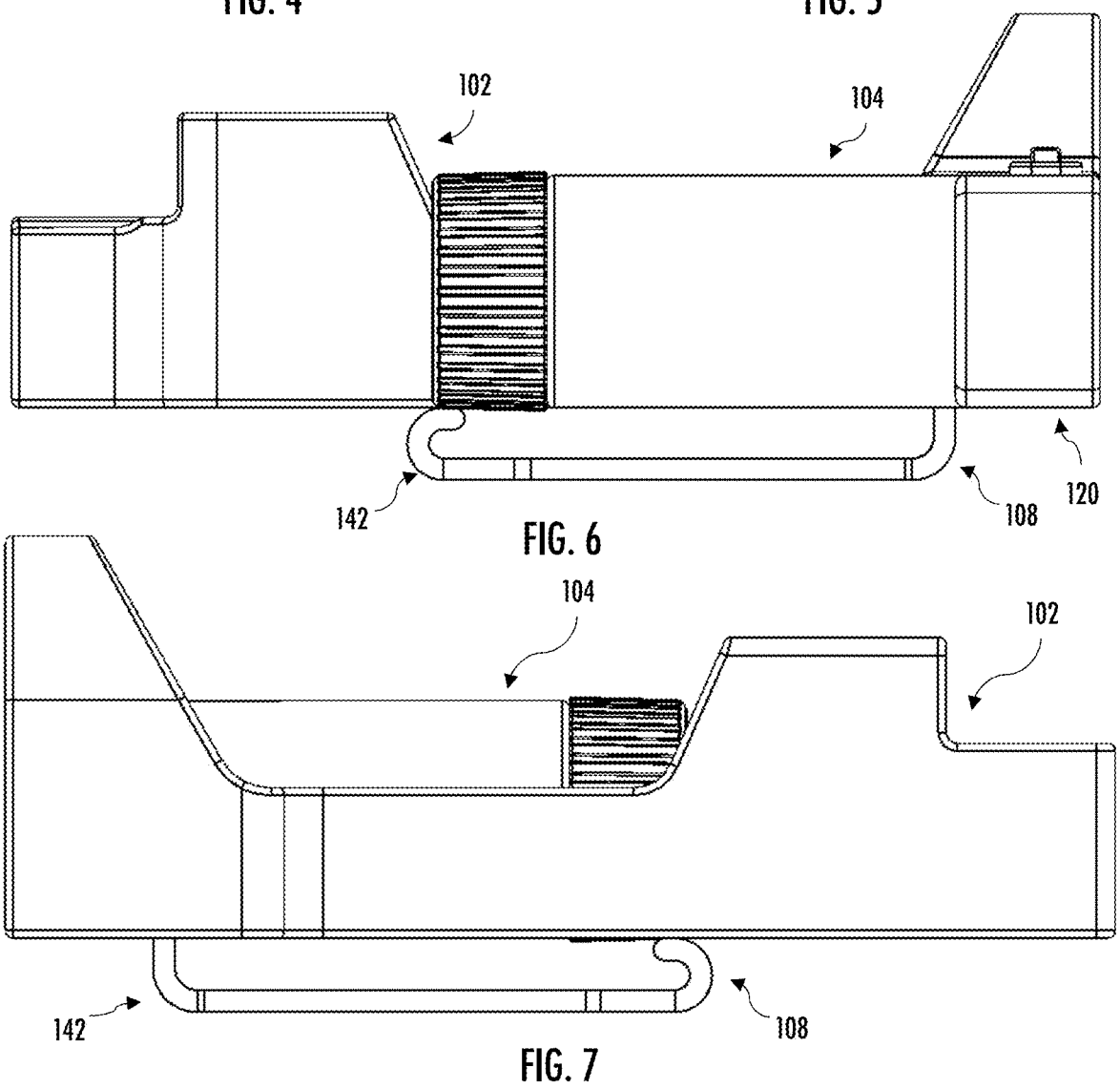
FIG. 6
FIG. 7

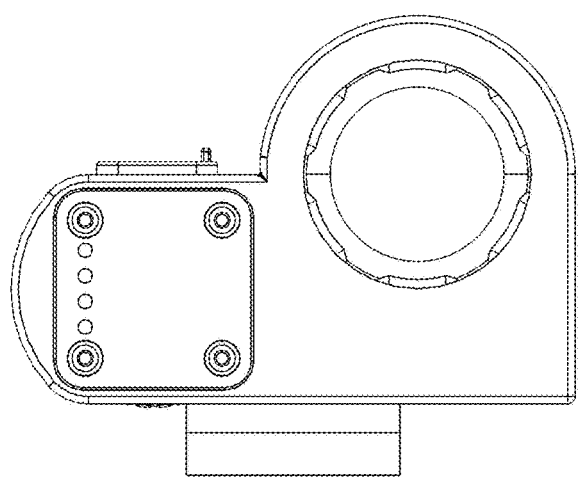
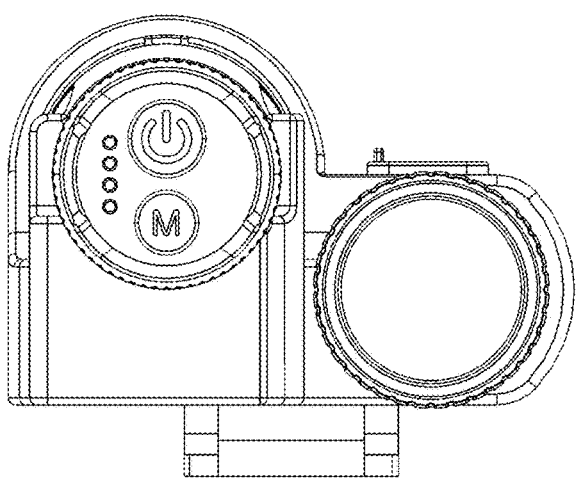
FIG. 18　　　　　　　　　FIG. 19
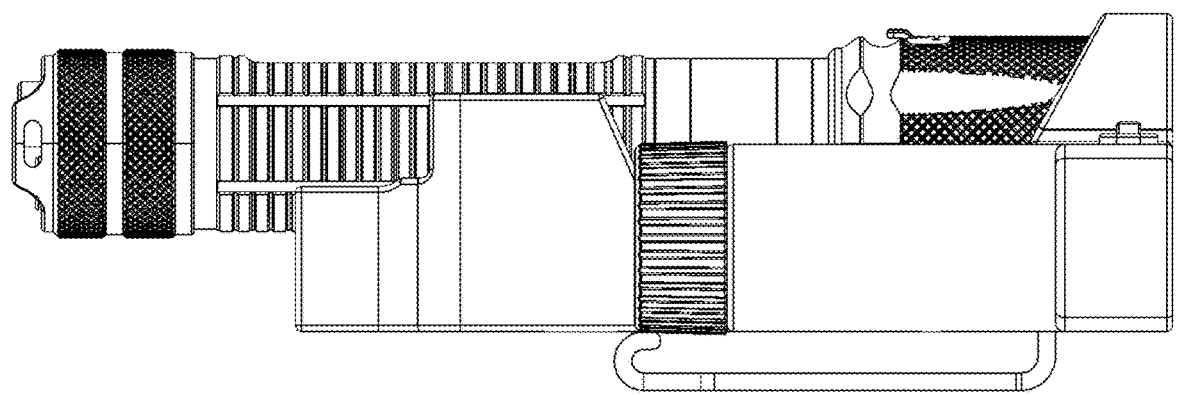
FIG. 20
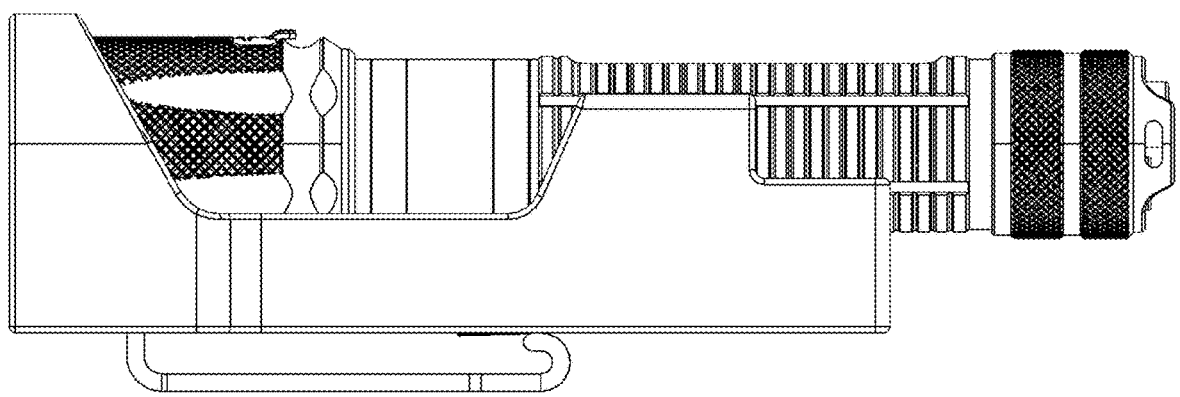
FIG. 21

CHARGING HOLSTER AND FLASHLIGHT

PRIORITY

This application is a continuation of, and claims the benefit of priority to, U.S. patent application Ser. No. 18/737,909 filed Jun. 7, 2024 and entitled "Charging Holster and Flashlight," incorporated by reference in its entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

TECHNICAL FIELD

This disclosure relates generally to the field of portable charging and lighting devices. More particularly, the present disclosure relates to charging apparatus for flashlights.

DESCRIPTION OF RELATED TECHNOLOGY

Many professionals use powered equipment like flashlights or other lighting devices for hours. Unfortunately, many flashlights will run out of battery charge in 2-4 hours. To keep using their tools for many hours, the professional may need to have spare batteries (rechargeable or single-use) available to replace depleted batteries in their equipment.

Some flashlights support a charging cradle. Typically, charging cradles are designed to electrically connect the flashlight to a wall outlet and hold a flashlight in place while charging. A wall outlet, also known as "mains" or "wall" power, provides alternating current (AC) electricity provided by the electrical power grid. While mains power may offer practically unlimited power, the transformer components and reliance on access to an electrical grid presents significant problems for most portable applications (e.g., camping and/or new construction use).

Unfortunately, such cradles do not allow the flashlight to be used or manipulated while charging and may require that the flashlight is returned to its charging location when not in use.

BRIEF DESCRIPTION OF THE DRAWINGS

FIG. 4 is a front view of the charging holster illustrated in FIG. 1.

FIG. 5 is a rear view of the charging holster illustrated in FIG. 1.

FIGS. 6 and 7 are side views of the charging holster illustrated in FIG. 1.

FIG. 18 is a front view of the flashlight charging system illustrated in FIG. 15.

FIG. 19 is a rear view of the flashlight charging system illustrated in FIG. 15.

FIGS. 20 and 21 are side views of the charging system illustrated in FIG. 15.

DETAILED DESCRIPTION

Figure 1:
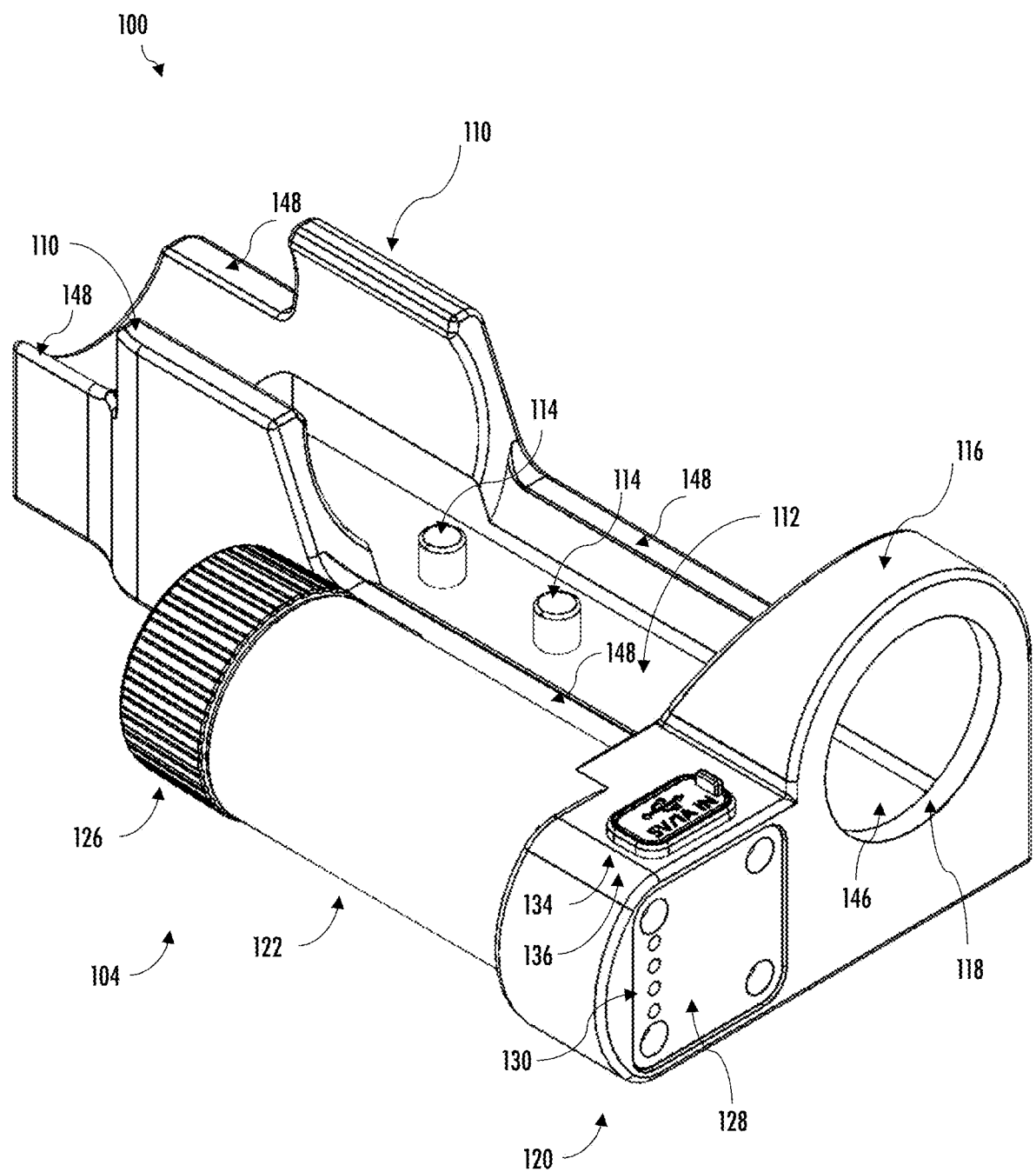
FIG. 1 is a perspective view of a charging holster according to aspects of the present disclosure.

In the following detailed description, reference is made to the accompanying drawings. It is to be understood that other embodiments may be utilized, and structural or logical changes may be made without departing from the scope of the present disclosure. Therefore, the following detailed description is not to be taken in a limiting sense, and the scope of embodiments is defined by the appended claims and their equivalents.

For purposes of the description hereinafter, it is to be understood that the specific articles, compositions, and/or processes described herein are exemplary and should not be considered as limiting. In the description, relative terms such as "lower," "upper," "horizontal," "vertical,", "above," "below," "up," "down," "top," "bottom," "underside," "front," "rear," and "side" as well as derivatives thereof (e.g., "horizontally," "downwardly," "upwardly," etc.) should be construed to refer to the orientation as then described or as shown in the drawing under discussion. These relative terms are for convenience of description and do not require that the apparatus be constructed or operated in a particular orientation. Terms concerning attachments, coupling and the like, such as "connected" and "interconnected," refer to a relationship wherein structures are secured or attached to one another either directly or indirectly through intervening structures, as well as both movable or rigid attachments or relationships, unless expressly described otherwise.

Aspects of the disclosure are disclosed in the accompanying description. Alternate embodiments of the present disclosure and their equivalents may be devised without departing from the spirit or scope of the present disclosure. It should be noted that any discussion regarding "one embodiment", "an embodiment", "an exemplary embodiment", and the like indicate that the embodiment described may include a particular feature, structure, or characteristic, and that such feature, structure, or characteristic may not necessarily be included in every embodiment. In addition, references to the foregoing do not necessarily comprise a reference to the same embodiment. Finally, irrespective of whether it is explicitly described, one of ordinary skill in the art would readily appreciate that each of the features, structures, or characteristics of the given embodiments may be utilized in connection or combination with those of any other embodiment discussed herein.

Various operations may be described as multiple discrete actions or operations in turn, in a manner that is most helpful in understanding the claimed subject matter. However, the order of description should not be construed as to imply that these operations are necessarily order dependent. The described operations may be performed in a different order than the described embodiments. Various additional operations may be performed and/or described operations may be omitted in additional embodiments.

1 Charging Holster

Aspects of the present disclosure are directed to a holster charging system for a lighting device. A charging holster may increase standard run times and provide extra power for use in other devices such as headlamps. The holster may provide powered storage for the flashlight. The holster may attach (via a clip) onto the belt, pocket, or bag of a user so they may carry the flashlight while the flashlight recharges. A user may be able to use the flashlight while charging the flashlight in the holster. The holster may have an aperture for an attached flashlight to shine through while electrically coupled to the holster.

In some embodiments, charging contacts on the charging holster are configured to electrically contact charging rings on the flashlight. The charging rings may electrically couple the flashlight to charging circuitry and allow the flashlight to easily mount to the charger in multiple orientations (in a 360° rotation about the barrel), rather than at a single orientation. A power button at the rear (e.g., in the end cap) of the flashlight may enable the flashlight to be powered on while holstered in the charging holster but also accessed by a user no matter the orientation the flashlight is installed in the holster.

Figure 2:
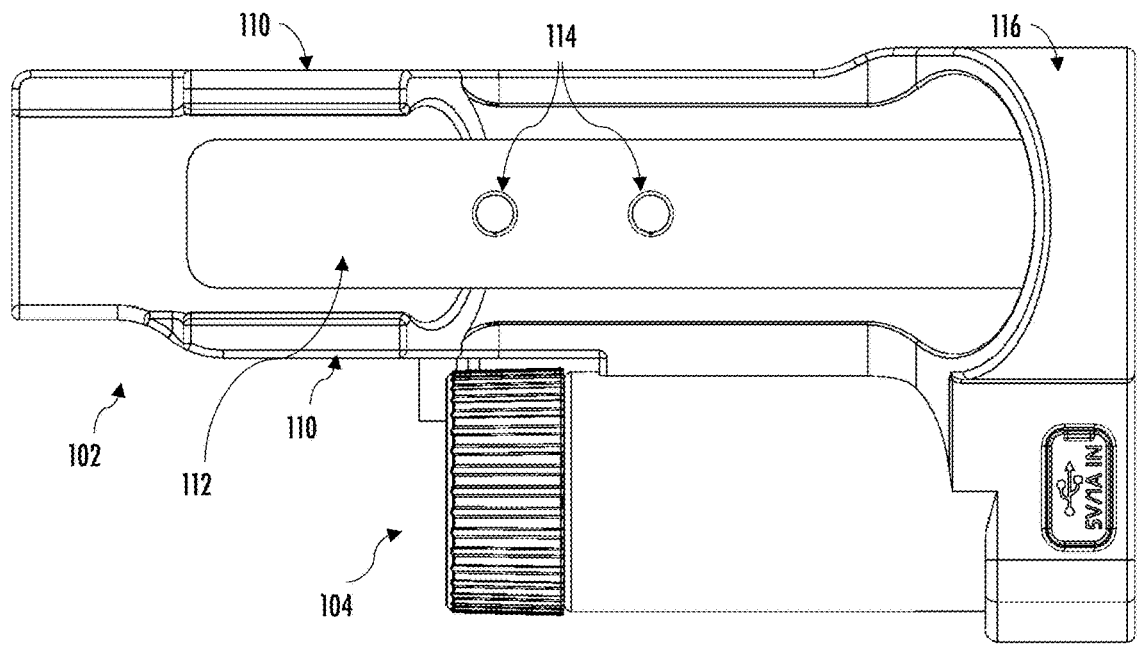
FIG. 2 is a top view of the charging holster illustrated in of FIG. 1.
Figure 3:
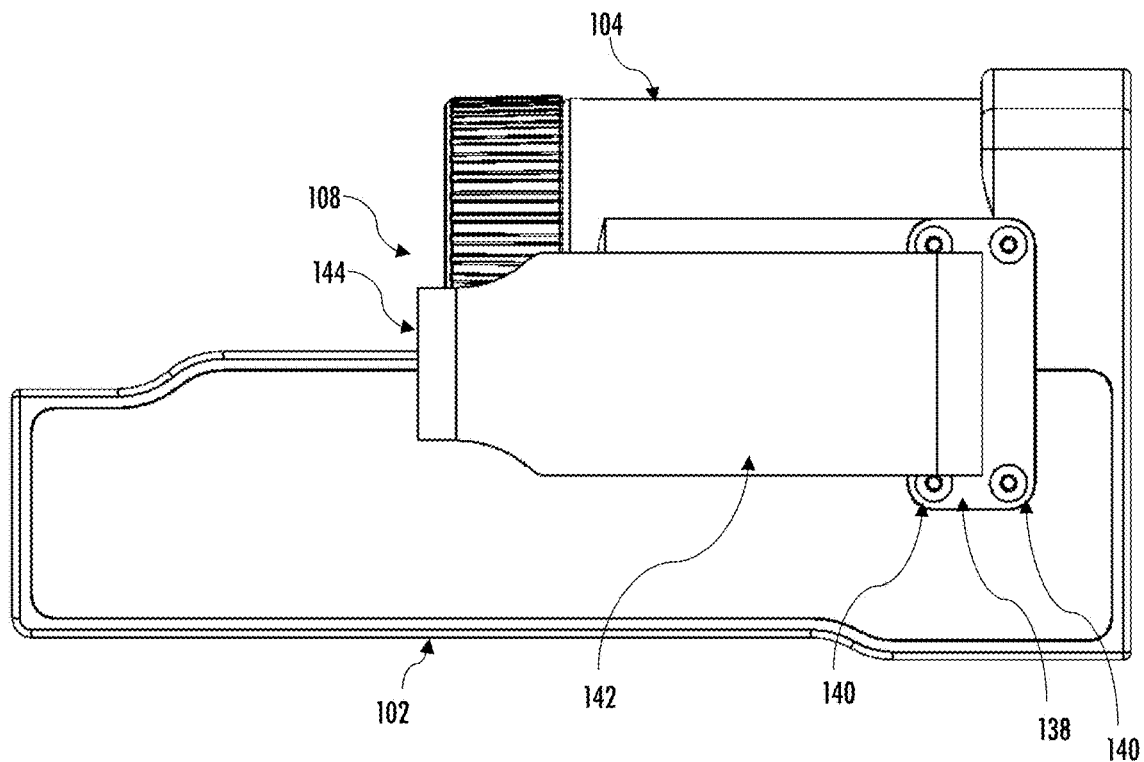
FIG. 3 is an underside view of the charging holster illustrated in FIG. 1.

Reference is now made to FIGS. 1-7. FIG. 1 is a perspective view of a charging holster 100 according to aspects of the present disclosure. FIG. 2 is a top view of the charging holster 100 of FIG. 1. FIG. 3 is an underside view of the charging holster 100 of FIG. 1. FIG. 4 is a front view of the charging holster 100 of FIG. 1. FIG. 5 is a rear view of the charging holster 100 of FIG. 1. FIGS. 6 and 7 are side views of the charging holster 100 of FIG. 1.

Charging holster 100 includes a charging cradle 102 and a battery compartment 104 (which may also be referred to as a power compartment 104) connected by a bridge 106 and clip assembly 108. The charging cradle 102 includes support arms 110 disposed at opposing sides of the charging cradle 102 and raised above the side walls 148 of the charging cradle 102. The support arms 110 may flex (outward) to accommodate a flashlight being inserted and removed and retain a barrel of the flashlight. The walls of the charging cradle 102 may form a semi- or open cylinder configured to fit the barrel of a flashlight. The charging cradle 102 may include a cutout 112 with a pair of charging contacts 114 in the cutout 112. The bridge 106 includes a retaining arch 116 with a rim 118 connecting to the charging cradle 102. The retaining arch 116 forms an aperture 146. The bridge 106 also includes a charging assembly 120 electrically coupled to charging contacts 114 of the charging cradle 102 and the battery compartment 104. The battery compartment 104 includes a battery barrel 122 configured to hold a battery 124 with a battery compartment cap 126 (which may also be referred to as a power compartment cap 126).

The charging assembly 120 is located in a cavity in the bridge 106 and includes a PCB cover 128 with indicator LEDs 130. The PCB cover 128 provides access (when opened) to a printed circuit board (PCB) 132. The PCB 132 is configured to control electrical/charging operation of the charging holster 100. More specifically, the PCB 132 may be electrically coupled to the charging contacts 114 to provide/monitor power to a connected flashlight. The charging assembly 120 also includes a charging port 134 where the charging holster 100 may be recharged from an external power source. The charging port 134 may be protected by a charging port cover 136. The PCB 132 may be electrically coupled to the battery 124 within the battery compartment 104, charging port 134, and/or other power sources. The PCB 132 may be electrically coupled to other components via wires or other electrical components (e.g., intermediate circuitry, etc.).

The charging holster 100/charging cradle 102 may be in one of various sizes depending on the size of the flashlight that the charging holster is configured to connect to and charge. For example, the charging holster 100/charging cradle 102 may be larger to accommodate larger flashlights (e.g., basic handheld flashlights, tactical flashlights, etc.) or smaller to accommodate smaller flashlights (e.g., pen lights, etc.). In some examples, the charging holster 100/charging cradle 102 may be able to accommodate multiple flashlights (e.g., two penlights, or a full-sized flashlight and a headlamp). The size of the charging holster 100 may be larger to accommodate a larger rechargeable battery (or multiple batteries), a battery cartridge (e.g., a battery/batteries in a housing), or other power types (single use batteries, solar power cells, multiple charging ports to connect to various types of external power, etc.). The charging holster 100 also may include storage for additional peripherals (e.g., charging cables to connect to external power for charging or to connect to other devices to output power).

Unlike other charging cradles, the charging holster 100 may be worn by a user during mobile use of the flashlight rather than, e.g., a charging base at the end of the day (or when not in use). A clip assembly 108 may be located on the underside of the charging holster 100 and connect to the charging cradle 102 and the battery compartment 104. The clip assembly 108 may be configured to clip on to the belt, waistband, shirt, bag, or other personal effects of a user, so a flashlight may be quickly removed for use and replaced back in the charging holster 100 to recharge. The clip assembly 108 includes a connector plate 138 connecting the clip assembly 108 to the charging holster 100 with fasteners 140. The connector plate 138 is coupled to a clip 142.

As illustrated, clip 142 is a belt clip configured to be securely clipped on the waistband or belt of a user without taking the belt off to remove the charging holster 100. The clip 142 includes a hook (or J-) shaped attachment point 144 configured to slide a waistband, belt, or strap through the clip 142 and provide spring tension toward the charging holster 100 to retain a connected waistband, belt, or strap. In other examples, the clip may include a belt tunnel or loops (e.g., one, two, or more pieces of metal, plastic, or fabric) configured to attach to the belt, clothing, or strap of a bag of a user. Belt loops may be detachable using snaps, clips, or other connectors for ease of attaching and detaching the charging holster 100 to a belt/bag of a user. In other examples, the clip 142 may be removably detachable from the connector plate 138 with e.g., a quick connector, to quickly detach and reattach the charging holster 100 from where the charging holster 100 is secured (e.g., a user's belt, a bag) during use.

To provide portable power, the charging holster 100 may include a battery 124 or other source of portable power (e.g., a solar panel) to recharge and/or power a flashlight or other connected device. In some examples, the battery 124 is a rechargeable battery. In some specific examples, the battery 124 includes a 21700 lithium-ion rechargeable battery that may provide voltage of approximately 3.7 v (e.g., 2.5-4.2 v) and includes between 3000 mAh and 5100 mAh of charge. Other batteries of a different form factor (e.g., an 18650 lithium-ion cell), chemistries (e.g., nickel-cadmium (Ni-CAD)) or type (e.g., AA/AAA single-use alkaline batteries) may be used with equal success based on the specific implementation and needs of the end user.

In some examples, the charging holster 100 may be configured to access power from multiple power sources. In some examples, the different power sources may be used in different power applications. For example, the multiple power sources may include: a 3.7V lithium-ion battery (rechargeable), AA batteries in series (4.5V low current draw), and D batteries (4.5V high current draw).

The charging holster 100 includes a battery compartment 104 to store and electrically couple with the battery 124. The battery compartment 104 includes a battery barrel 122 configured to hold the battery 124 with a battery compartment cap 126. The battery compartment cap 126 may be removable by an end user to provide access to (and replace) the battery 124 in the battery compartment 104. The battery compartment cap 126 may include threads (e.g., helical ridges or grooves) on the battery compartment cap 126. These threads are designed to match and engage with the corresponding threads on the battery barrel 122 of the battery compartment 104, allowing the battery compartment cap 126 to be screwed on or off. To make the battery compartment cap 126 easier to grip and rotate during installation or removal, the battery compartment cap 126 may include ridges, knurling, or other texture along the outer periphery for improved handling.

The battery compartment cap 126 may include a spring to couple to an electrical contact on the battery 124 and hold the battery 124 in place within the battery compartment 104 and to allow the battery compartment 104 to electrically couple to another electrical contact on the battery 124. The battery compartment 104 may be electrically coupled to the charging assembly 120 to control charging and discharging of the battery 124.

The charging assembly 120 includes a PCB 132 configured to control electrical/charging operation of the charging holster 100. In some examples, multiple PCBs or other circuits are used to perform the tasks performed by PCB 132. Circuitry on the PCB 132 may include microcontrollers, memory/data storage, charging circuitry, and/or other circuitry. For example, PCB 132 may include circuitry to prevent over (and under) charging of the battery 124 in the charging holster 100. In one example, the circuitry includes a protection circuit module (PCM) configured to manage basic safety functions of the battery 124 including over-voltage, under-voltage, and over-current. In some cases, the PCM additionally monitors battery temperature which can be used to infer aspects of battery operation (e.g., performance, charging state, etc.). In some additional examples, PCB 132 includes a secondary safety circuit to protect the battery 124 from damage in the event the primary safety circuit fails.

The PCB 132 may include charging circuitry and associated interfaces to recharge the battery 124 and/or the flashlight via the charging contacts 114. For example, the charging assembly 120 also includes a charging port 134 where the charging holster 100 may be recharged from an external power source (e.g., an external power bank or a wall socket/mains power). A user may remove or open the charging port cover 136 to access a charging port. The charging port 134 may include a mini-USB, micro-USB, USB-C, Lightning®, Power over Ethernet (PoE), or a direct current (DC) power connector socket (to connect to, e.g., one or more types of barrel connectors or multi-pin connectors), etc. connectable to an external power source via an attachable cable. In another example, a solar panel or hand crank may be used to charge the battery 124 where there is sufficient ambient light. As will be appreciated by those of ordinary skill, other charging interfaces (and associated power requirements) may be substituted with equal success.

In some variants, the charging holster 100 may include external charging and/or data transfer capability via an external interface. For example, some charging holsters may include a USB port to charge an attached headlamp, smart phone, or other peripheral device. Examples of such external charging interfaces may include e.g., mini-USB, micro-USB, USB-C, Lightning®, Power over Ethernet (PoE) and/or other power delivery interfaces. In some such variants, the charging holster 100 may also allow data/media transfer to or from an attached device. As but one such example, the charging holster 100 may serve as a speaker for playing music, a speaker and microphone "intercom" for hands-free cellphone operation, a device hub, an external hard drive for storing/transferring media, etc. Media playback assemblies may include associated components: e.g., a wired/wireless interface (e.g., USB™, Bluetooth®, Wi-Fi™, etc.), codecs, user interfaces, screens, speakers, and/or microphones.

Each of the operational modes (e.g., lighting modes of an attached flashlight, charging modes, idle mode, etc.) may have different power requirements. Power management logic (hardware, firmware, or software) in the PCB 132 may select one or more power sources that is suitable for the operational mode. In some cases, the power management logic may select the power source based on the operational mode.

Indicator LEDs 130 on the charging assembly 120 may indicate remaining charge, the amount of load, and the type of charge/discharge on the battery 124. In one specific implementation, the user interface logic controls the indicator LEDs 130 that visually represents usage estimates with a numerosity and color code. As illustrated, the four indicator LEDs correspond to remaining capacity and/or current draw on the battery 124. In some examples with multiple power sources, multiple rows of indicator LEDs may be used to indicate capacity/draw for each of multiple sources. The indicator LEDs 130 may be enabled/illuminated according to the estimated remaining battery capacity at the current duty cycle. For instance, where two indicator LEDs are illuminated, the battery 124 has about 50% of its capacity, 3 LEDs illuminated indicates the battery 124 has about 75% of its capacity remaining, etc. Additionally, each LED may emit light in one of three colors that dynamically correspond to the current draw: red (high current draw), orange (moderate current draw), and green (low/no current draw). So, as an example, if the indicator LEDs 130 are lit in red, then the battery 124 has a high current draw (and is rapidly depleting). If the indicator LEDs 130 are lit orange, then the battery 124 is under moderate use, etc.

In some examples, indicator LEDs 130 may include a row corresponding to the remaining capacity and/or current draw on an internal battery 810 of the flashlight 800 (described below). Information regarding the state of the internal battery 810 of the flashlight 800 may be provided by monitoring/power management logic on the flashlight 800 and transferred through a data connection to the PCB 132 of the charging holster 100 (via, e.g., the charging contacts 114).

In some embodiments, the user interface logic provides a continuous read-out (to, e.g., the indicator LEDs 130). Other embodiments may allow the user to selectively check the battery usage estimates only "as-needed." For example, all LED rows may be only momentarily lit when the user presses the ON switch, or a user may be able to individually check the power for only one of the power sources (e.g., a small push button may allow a user to check the status of the battery 124, etc.). Still other implementations may allow display status briefly at the start of and/or periodically during, a specific operating mode. For example, plugging a USB charging device may draw current from the battery 124 to start, and flash the status every minute (via the indicator LEDs 130). Once the battery 124 is depleted, the external device may be switched to another power source (e.g., mains power/USB charging via the charging port 134, solar power, etc.)—status may flash every minute via a different set of indicator LEDs, etc.

More generally, the user interface logic of the PCB 132 and indicator LEDs 130 allows a user to determine the ongoing usage and remaining capacity for any one of the power sources. In some cases, the user may be alerted as to when to change batteries, switch power sources, and/or reduce usage. As but one example, a user that is on a camping trip or a remote work site may not have ready access to disposable batteries. They may use a lower powered flashlight or switch their flashlight to a lower power mode to ensure that the holster has enough power to last for the entire trip. Conversely, they may disable flashlight charging and use the holster to charge their cell phone to ensure they can call out for assistance. In other words, users can use their power usage information to budget their usage according to their needs.

2 Flashlight

Figure 8:
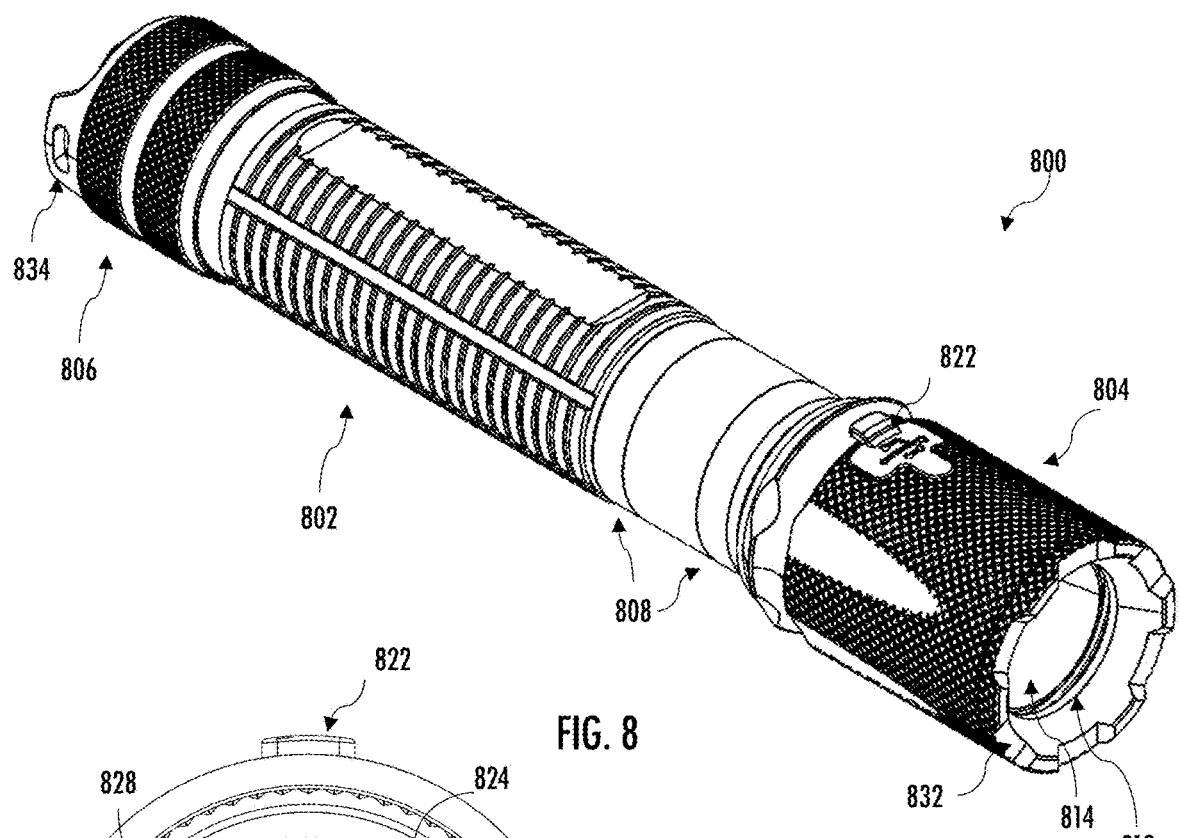
FIG. 8 is a perspective view of a flashlight according to aspects of the present disclosure.
Figure 9:
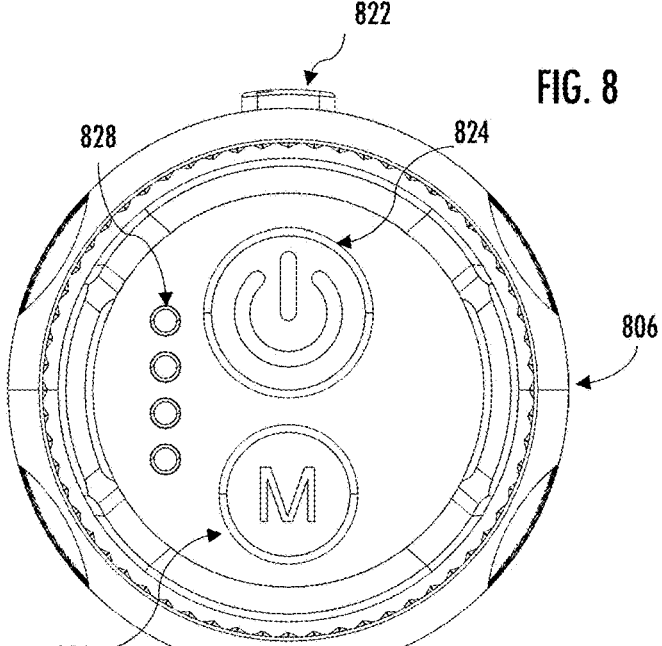
FIG. 9 is a rear view of the flashlight illustrated in FIG. 8.
Figure 10:
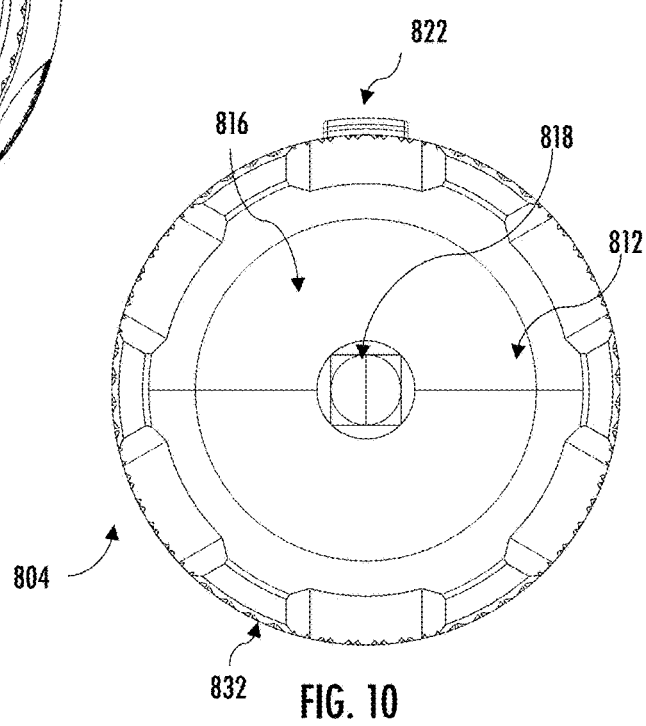
FIG. 10 is a front view of the flashlight illustrated in FIG. 8.
Figure 11:
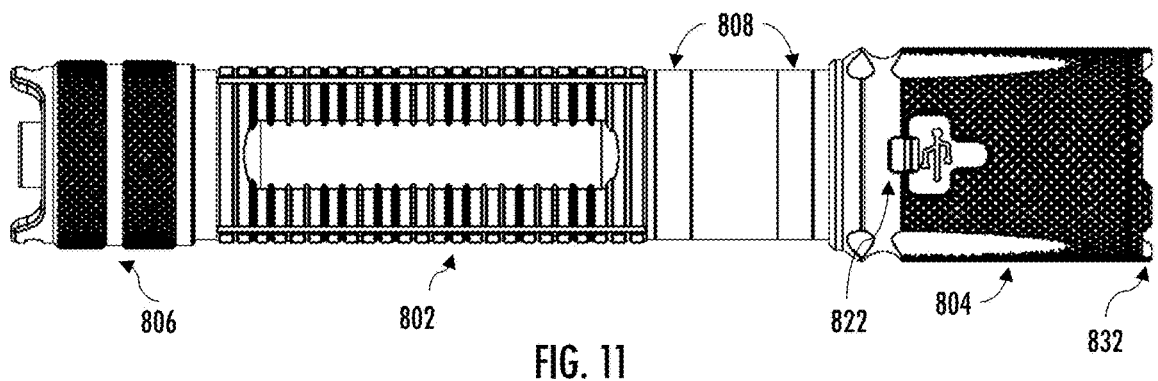
FIG. 11 is a top view of the flashlight illustrated in FIG. 8.
Figure 12:
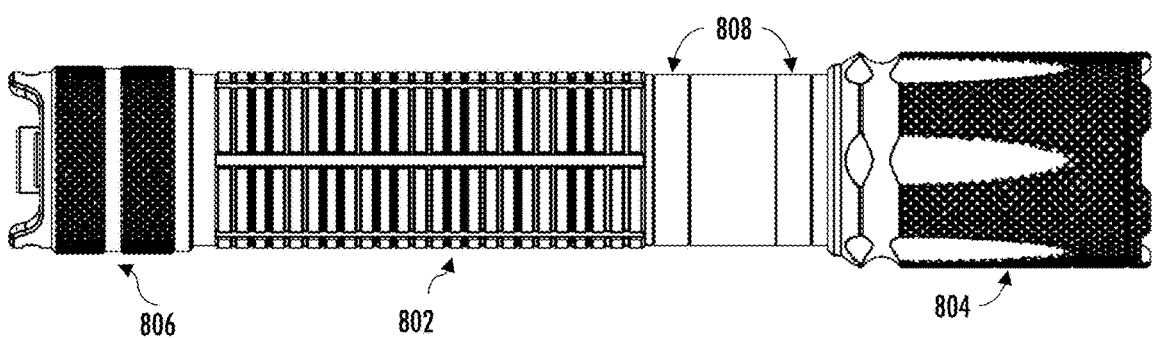
FIG. 12 is an underside view of the flashlight illustrated in FIG. 8.
Figure 13:
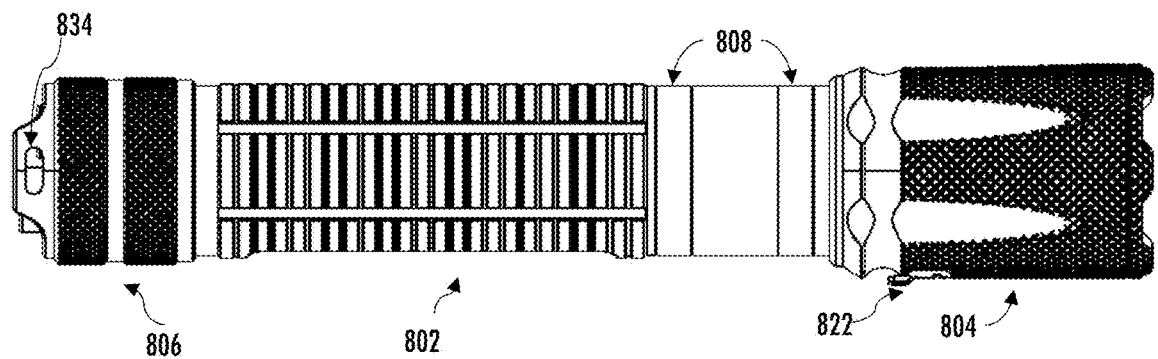
FIGS. 13 and 14 are side views of the flashlight illustrated in FIG. 8.
Figure 14:
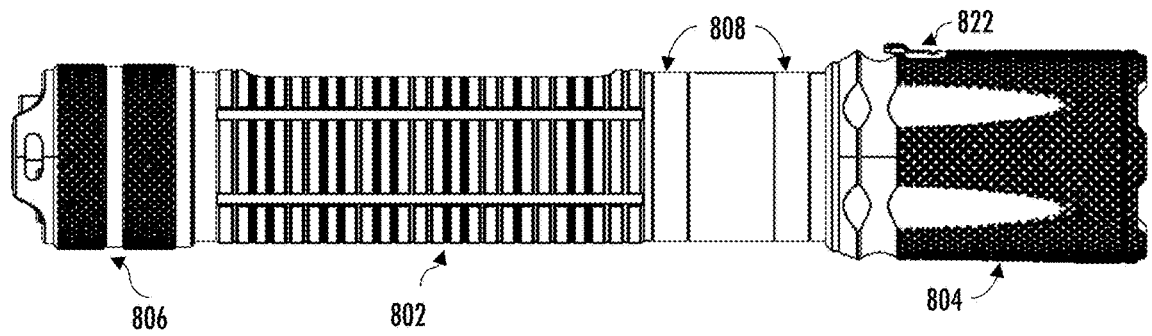

FIG. 8 is a perspective view of a flashlight 800 according to aspects of the present disclosure. FIG. 9 is a rear view of the flashlight 800 of FIG. 8. FIG. 10 is a front view of the flashlight 800 of FIG. 8. FIG. 11 is a top view of the flashlight 800 of FIG. 8. FIG. 12 is an underside view of the flashlight 800 of FIG. 8. FIGS. 13 and 14 are side views of the flashlight 800 of FIG. 8.

Flashlight 800 includes a cylindrical barrel 802, a head component 804, and a tail cap 806. The barrel 802 may include charging rings 808 and internal storage for a battery 810. The barrel 802 may include ridges, knurling, or other texture along the outer periphery for improved handling during operation and for installation and removal from charging holster 100. The barrel 802 may also include flat/un-textured/un-ridged portions for a user to comfortable place their thumb when handheld. The charging rings 808 on the barrel 802 of the flashlight 800 may electrically couple to charging contacts 114 of the charging holster 100 for power/charging when the flashlight 800 is inserted into the charging holster 100.

The head component 804 may include one or more light-emitting assemblies 812 including lens 814, reflector 816, and light emitting diode (LED) 818. The light-emitting assemblies 812 may be used together, or individually, in a variety of different operating modes (e.g., high intensity, moderate intensity, low intensity, night mode (red light), signaling (blinking) mode, etc.). The head component 804 may also include a charging port 820 where the flashlight 800 (or an installed battery 810 in the flashlight 800) may be recharged (directly) from an external power source rather than, e.g., by using charging holster 100. The charging port 820 may be protected by a charging port cover 822. The head component 804 may include a bezelled rim 832 around the circumference.

The tail cap 806 of the flashlight 800 may be removable by an end user to provide access to (and replace) the battery 810 in the battery compartment of the barrel 802 of the flashlight 800. The tail cap 806 may include threads (e.g., helical ridges or grooves). These threads are designed to match and engage with the corresponding threads on the barrel 802 of the flashlight 800, allowing the tail cap 806 to be screwed on or off. To make the tail cap 806 easier to grip and rotate during installation or removal, tail cap 806 may include ridges, knurling, or other texture along the outer periphery for improved handling. The tail cap 806 may include attachment apertures 834 to connect the flashlight 800 with a cord, lanyard, clip, or other attachment mechanism.

The tail cap 806 may include a spring to couple to an electrical contact on the battery 810 and hold the battery 810 in place within the barrel 802 and to allow other circuitry within the barrel 802/flashlight 800 to electrically couple to another electrical contact on the battery 810.

The tail cap 806 includes a power switch 824, a mode switch 826, and indicator LEDs 828. In certain charging cradles, a flashlight inserted into the charging cradle may be limited to a specific orientation. For example, where electrical contacts on the charging cradle/flashlight limit the orientation of the flashlight while charging. Even with charging cradles where the flashlight 800 may be inserted at any radial/rotational orientation relative to its longitudinal axis (along the length from tail cap 806 to head component 804), switches and indicators may be obscured when located on the barrel of the flashlight. According to aspects of the present disclosure, the inclusion of the power switch 824, a mode switch 826, and/or indicator LEDs 828 on the tail cap 806 of the flashlight 800 may allow a user to interact with the power switch 824/mode switch 826 or view the indicator LEDs 828 when the flashlight 800 is secured in the charging holster 100 regardless of the radial orientation of the flashlight 800 within the charging holster 100.

The power switch 824 is configured to switch power modes (e.g., on and off) of the flashlight 800 and, when powered on, illuminate the LED 818 according to a default or previously active operating mode. The mode switch 826 is configured to toggle between various operating modes of the flashlight 800. The power switch 824, the mode switch 826 and indicator LEDs 828 may be electrically coupled to a PCB 830 configured to control operation and charging of the flashlight 800. In some examples, multiple PCBs or other circuits are used to perform the tasks performed by PCB 830.

Circuitry on the PCB 830 may include microcontrollers, memory/data storage, charging circuitry, and/or other circuitry. For example, PCB 830 may include circuitry to prevent over (and under) charging of the battery 810 in the flashlight 800, to select/direct power from a charging apparatus (e.g., charging rings 808 or charging port 820) or the battery 810 to operate the LEDs 818 according to one of the plurality of operating modes or recharge the battery 810. In one example, the circuitry includes a protection circuit module (PCM) configured to manage basic safety functions of the battery 810 including over-voltage, under-voltage, and over-current. In some cases, the PCM additionally monitors battery temperature which can be used to infer aspects of battery operation (e.g., performance, charging state, etc.). In some additional examples, PCB 830 includes a secondary safety circuit to protect the battery 810 from damage in the event the primary safety circuit fails.

The PCB 830 may include charging circuitry and associated interfaces to recharge the battery 810 via a charging apparatus (e.g., charging rings 808 or charging port 820). The flashlight 800 may be recharged from an external power source (e.g., an external power bank or a wall socket/mains power) via the charging rings 808 or the charging port 820. A user may remove or open the charging port cover 822 to access the charging port 820. The charging port 820 may include a mini-USB, micro-USB, USB-C, Lightning®, Power over Ethernet (PoE), or a direct current (DC) power connector socket (to connect to, e.g., one or more types of barrel connectors or multi-pin connectors), etc. connectable to an external power source via an attachable cable. As will be appreciated by those of ordinary skill, other charging interfaces (and associated power requirements) may be substituted with equal success, e.g., solar panels or hand cranks.

Charging rings 808 include an exposed metallic contacts configured to contact corresponding contacts, e.g., charging contacts 114 in the charging holster 100, to form part of the conductive path to recharge the battery 810 and/or power the flashlight 800. In some embodiments, one of the charging rings 808 corresponds to a positive contact configured to connect with a positive contact of the charging contacts 114 of the charging holster 100. The other charging ring of the charging rings 808 corresponds to a negative contact configured to connect with a negative contact of the charging contacts 114 of the charging holster 100.

In some variants, the flashlight 800 may include external charging and/or data transfer capability via an external interface. For example, the flashlight 800 may include a USB port to charge an attached headlamp, smart phone, or other peripheral device. Examples of such external charging interfaces may include e.g., mini-USB, micro-USB, USB-C, Lightning®, Power over Ethernet (PoE) and/or other power delivery interfaces. In some such variants, the flashlight 800 may also allow data/media transfer to or from an attached device. As but one such example, the flashlight 800 may serve as a speaker for playing music, a speaker and microphone "intercom" for hands-free cellphone operation, a device hub, an external hard drive for storing/transferring media, etc. Media playback assemblies may include associated components: e.g., a wired/wireless interface (e.g., USB™, Bluetooth®, Wi-Fi™, etc.), codecs, user interfaces, screens, speakers, and/or microphones.

Each of the operating modes (e.g., high intensity, moderate intensity, low intensity, night mode (red light), signaling (blinking) mode, charging mode, etc.) may have different power requirements. Power management logic (hardware, firmware, or software) in the PCB 830 may select one or more power sources (e.g., from battery 810, charging rings 808, or charging port 820) suitable for the operating mode. In some cases, the power management logic may select the power source based on the operating mode.

For example, high/moderate intensity lighting modes of the flashlight 800 may draw large amounts of power and use the battery 810; conversely, the low/night/signaling mode (or just one of the light-emitting assemblies 812) may draw smaller amounts of power from the connected external charging apparatus (via e.g., charging rings 808 or charging port 820). In some cases, the power management logic may additionally consider the type of load and/or a reserve power threshold. Still other variants may allow the user to select the appropriate power source; for example, a user may want to manually switch between the using the (internal) battery 810, the battery 124 in the charging holster 100, or other connected power device/mains power.

In one specific implementation, the user interface logic controls the indicator LEDs 828 that visually represents usage estimates with a numerosity and color code. As illustrated, the four indicator LEDs 828 correspond to remaining capacity and/or current draw on the battery 810. In some examples with multiple power sources (e.g., different battery types in a battery cartridge), multiple rows of indicator LEDs may be used to indicate capacity/draw for each of multiple sources. The indicator LEDs 828 may be enabled/illuminated according to the estimated remaining battery capacity at the current duty cycle. For instance, where two indicator LEDs are illuminated, the battery 810 has about 50% of its capacity, 3 LEDs illuminated indicates the battery 810 has about 75% of its capacity remaining, etc. Additionally, each LED may emit light in one of three colors that dynamically correspond to the current draw: red (high current draw), orange (moderate current draw), and green (low/no current draw). So, as an example, if the indicator LEDs 828 are lit in red, then the battery 810 has a high current draw (and is rapidly depleting). If the indicator LEDs 828 are lit orange, then the battery 810 is under moderate use, etc.

In some examples, indicator LEDs 828 may include a row corresponding to the remaining capacity and/or current draw on the battery 124 of the charging holster 100 (or other attached device). Information regarding the state of the battery 124 of the charging holster 100 may be provided by monitoring/power management logic on the charging holster 100 and transferred through a data connection to the PCB 830 of the flashlight 800 (via, e.g., the charging rings 808).

3 Flashlight Charging System

Figure 15:
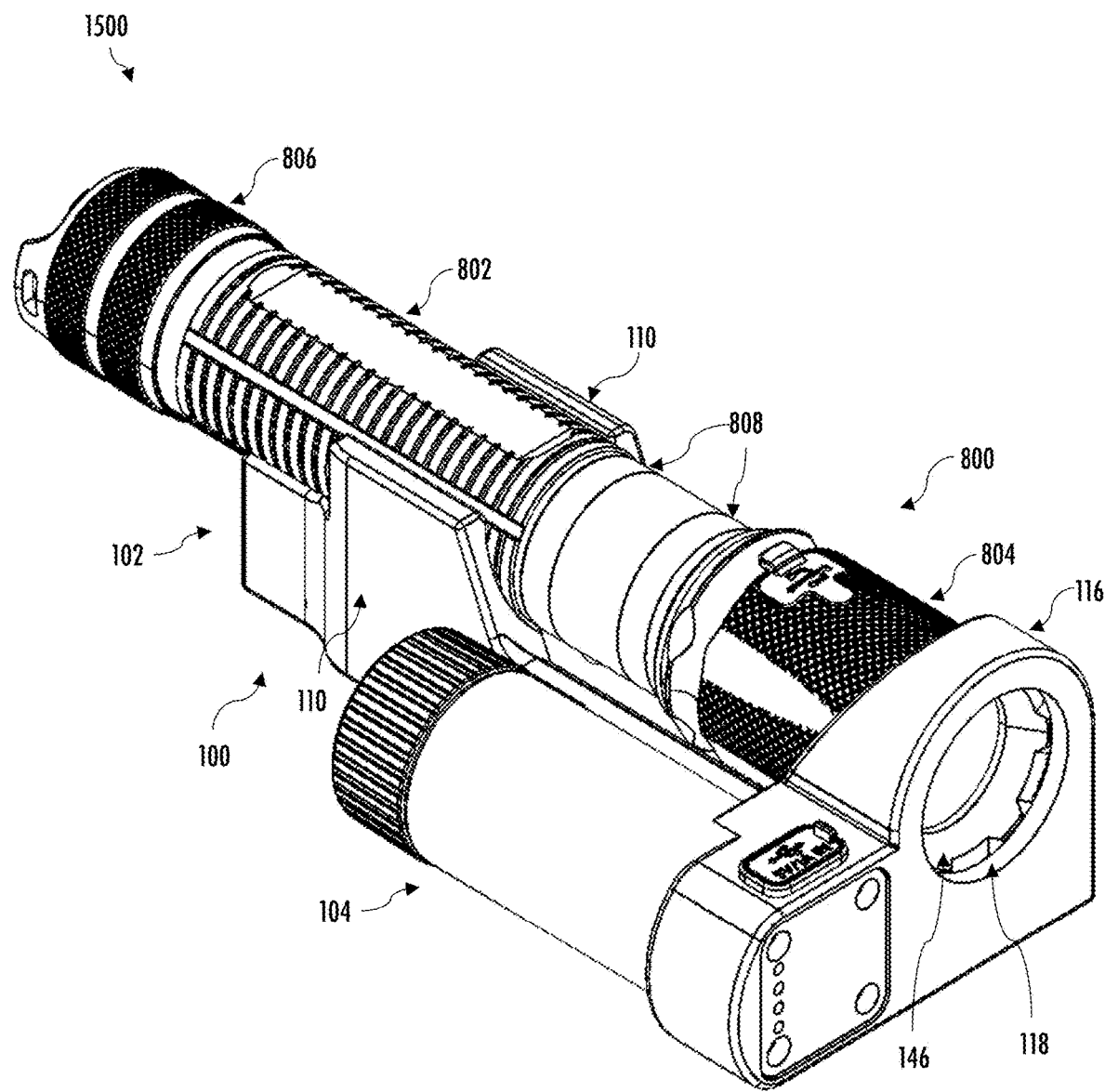
FIG. 15 is a perspective view of a flashlight charging system including a charging holster and installed flashlight, according to aspects of the present disclosure.
Figure 16:
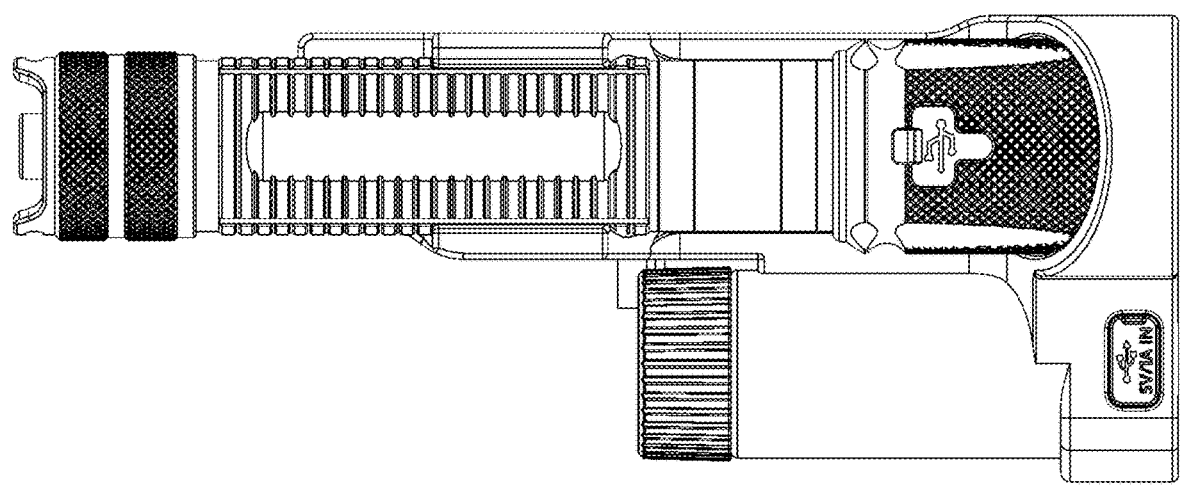
FIG. 16 is a top view of the flashlight charging system illustrated in FIG. 15.
Figure 17:
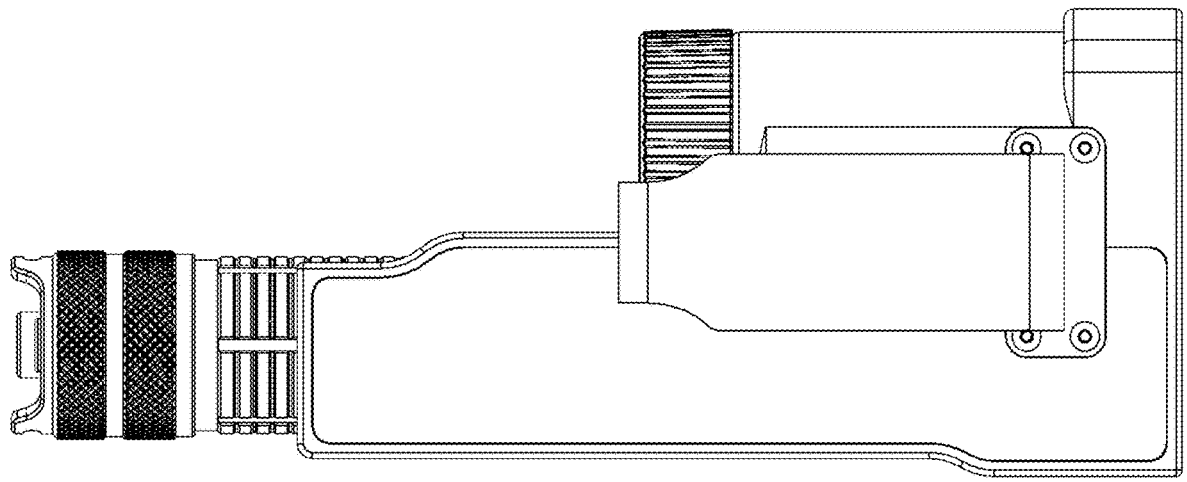
FIG. 17 is an underside view of the flashlight charging system illustrated in FIG. 15.

FIG. 15 is a perspective view of a flashlight charging system 1500 including the charging holster 100, illustrated in FIGS. 1-7, with the flashlight 800, illustrated in FIGS. 8-15, installed, according to aspects of the present disclosure. FIG. 16 is a top view of the flashlight charging system 1500 of FIG. 15. FIG. 17 is an underside view of the flashlight charging system 1500 of FIG. 15. FIG. 18 is a front view of the flashlight charging system 1500 of FIG. 15. FIG. 19 is a rear view of the flashlight charging system 1500 of FIG. 15. FIGS. 20 and 21 are side views of the flashlight charging system 1500 of FIG. 15.

Figure 22:
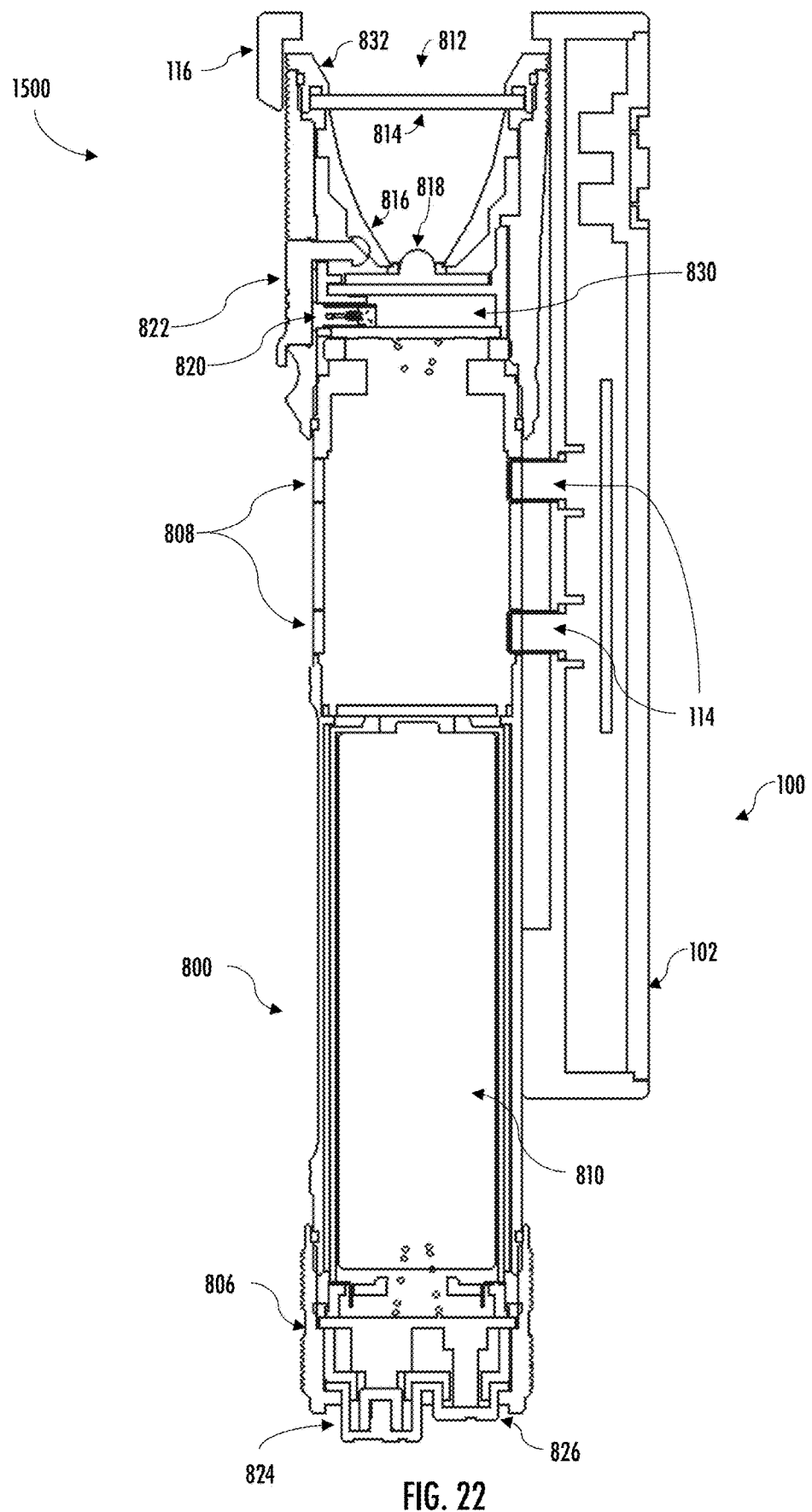
FIG. 22 is a longitudinal cross-sectional view of the flashlight charging system illustrated in FIG. 15.
Figure 23:
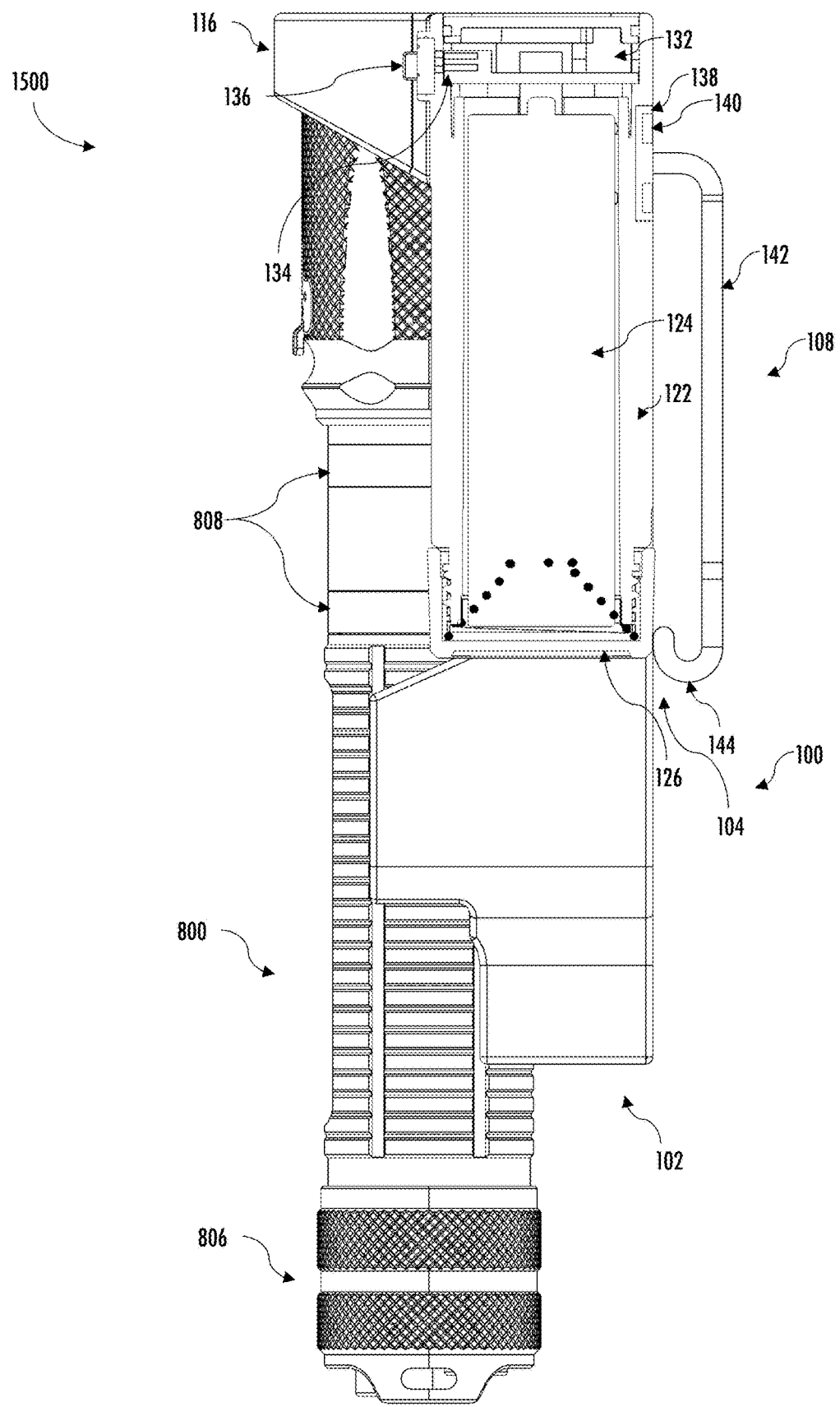
FIG. 23 is a longitudinal cross-sectional view of the flashlight charging system illustrated in FIG. 15.

FIG. 22 is a longitudinal cross-sectional view of the flashlight charging system 1500 across the center of the charging cradle 102 with the flashlight 800 installed in the charging holster 100 according to aspects of the present disclosure. FIG. 23 is a longitudinal cross-sectional view of the flashlight charging system 1500 across the center of the battery compartment 104 according to aspects of the present disclosure.

While secured within the charging holster 100, at least a portion of the barrel 802 of the flashlight 800 may be disposed between (and held in place by) a base with a semi-cylindrical interior portion of the charging cradle 102 and the support arms 110. At least a portion of the head component 804 of the flashlight 800 may be disposed between (and held in place by) the retaining arch 116 and the base (at the cutout 112 or semi-cylindrical interior portion) of the charging cradle 102. The charging rings 808 of the flashlight 800 electrically coupled to the charging contacts 114 of the charging holster 100. While secured in the charging holster 100, the flashlight 800 may rotate freely around a central axis of the barrel 802. The support arms 110 may partially encircle a portion of the barrel 802 of the flashlight 800 with the semi-cylindrical base of the charging cradle 102. The support arms no providing retaining force/pressure on the barrel 802 of the flashlight 800 to keep the flashlight 800 from dislodging from the support arms 110 during normal operation and use while still allowing a user to remove the flashlight 800 from the charging holster 100. The retaining arch 116 may encircle a portion of the head component 804 During rotation while secured within the charging holster 100, the flashlight 800 may remain electrically coupled to the charging contacts 114 because the charging rings 808 encircling the circumference of the barrel 802 of the flashlight remaining electrically coupled during rotation.

To remove the flashlight 800 from the charging holster 100 a user may grasp the flashlight 800 at the barrel 802 and lift away from the charging holster 100. The lifting motion may cause the flashlight 800 to pivot about the head component 804 releasing the barrel 802 of the flashlight 800 from the support arms 110 of the charging cradle 102. A clicking sound may be produced by the charging holster 100 to indicate the barrel of the flashlight 800 has been released by the support arms 110 of the charging holster 100. The flashlight 800 may be pulled away from the retaining arch 116 of the charging holster 100 by the user.

To return the flashlight 800 to the charging holster 100 for charging, a user may grasp the flashlight 800 at the barrel 802 and fit the head component 804 into the retaining arch 116 of the charging holster 100. The user may then pivot the flashlight 800 about the head component 804 and press the flashlight 800 into the support arms 110 of the charging cradle 102 of the charging holster 100. A clicking sound may be produced by the charging holster 100 to indicate the barrel of the flashlight 800 is being held by the support arms 110 of the charging holster 100. The flashlight 800 may be placed into the charging holster 100 at any radial/rotational orientation relative to the longitudinal axis of the flashlight 800 (along the length from tail cap 806 to head component 804).

To operate the flashlight 800, a user may press the power switch 824 to turn the flashlight 800 "on" or "off." To change operating modes, a user may press the mode switch 826 to toggle between various operating modes. As described, the power switch 824 and the mode switch 826 may be located on the tail cap 806 of the flashlight 800 and accessible to a user when secured in the charging holster 100 regardless of the radial orientation of the flashlight 800. When the flashlight 800 is installed in the charging holster 100, the light-emitting assemblies 812 are visible (e.g., viewable by a user/observer) through the aperture 146 formed by the retaining arch 116 of the charging holster 100 and may shine light through the aperture 146. Thus, the flashlight 800 may be fully operated while in the charging holster 100 (while, e.g., the battery 810 of the flashlight 800 is charging).

When the flashlight 800 is secured in the charging holster 100, the battery 810 inside the flashlight 800 may be recharged from the battery 124 inside the charging holster 100. The charging rings 808 on the flashlight 800 may contact the charging contacts 114 of the charging holster 100 when the flashlight 800 is secured in the charging holster 100. An additional load (e.g., to charge the battery 810 or to power for operating the LED 818 of the flashlight 800) may be detected by the PCB 132 of the charging holster 100 and the PCB 132 may provide, via the charging contacts 114, power to the flashlight 800. The PCB 132 of the charging holster 100 may provide power from the battery 124 or other power source, e.g., via charging port 134, to the flashlight 800. The PCB 830 of the flashlight 800 may direct the power to the battery 810, LED 818, or other operations of the flashlight 800 (e.g., to power PCB 132, indicator LEDs 828). PCB 830 may direct the indicator LEDs 828 to indicate (via a color change, blinking, etc.) that the battery 810 of the flashlight 800 is currently charging or power is being provided from an external source (e.g., the charging holster 100 or via the charging port 820). The PCB 830 may determine that the battery 810 is fully charged. The PCB 830 may no longer supply power to the battery 810 (using available power received via the charging rings 808 to power current operations of the flashlight 800 including powering PCB 830, LED 818, etc. Upon detecting a drop in load, the PCB 132 of the charging holster 100 may reduce the power provided via the charging contacts 114.

When the charging holster 100 is electrically coupled to a source of external power (e.g., via charging port 134), the PCB 132 can direct power to various loads, both internal and external. The PCB 132 of the charging holster 100 may prioritize power to certain loads when multiple loads are connected. For example, the charging holster 100 may prioritize power to connected devices (e.g., to power or charge the flashlight 800) over internal loads (e.g., charging the battery 124 of the charging holster 100). In such examples, the charging holster 100 may re-charge the battery 810 on the flashlight 800 until it is fully charged, or charged to a predetermined level, at which point the PCB 132 may direct charge to the battery 124 (or other load). Additional power/charging schemes may be used by PCB 132 to prioritize certain loads. For example, the PCB 132 may direct power to the battery 124 and from the battery 124 to additional loads (e.g. a connected device). When prioritizing power, the PCB 132 may direct all the power to the designated load (and none to other loads). In other examples, the PCB 132, may direct a greater share (e.g., a majority) of power to a designated load and less power (e.g., a minority) to other loads.

In some exemplary embodiments, the same type of battery may be accepted in the battery compartment 104 of the charging holster 100 and the battery compartment of the barrel 802 of the flashlight 800. In some examples, the charging holster 100 and the flashlight 800 may accept batteries of the same size/shape. In further examples, the flashlight 800 or the charging holster 100 may accept the battery from the other device by placing the battery into a battery cartridge or adapter that can accept the battery. The battery cartridge or adapter can then be inserted into (and provide power to/receive power from) the respective device. In other examples, flashlight 800 or the charging holster 100 can accept multiples of the battery. For example, the flashlight 800 may accept one of a particular type of rechargeable battery whereas the charging holster 100 may accept multiple of that battery type. In such cases, multiple of the rechargeable battery may need to be inserted into the charging holster 100 for the batteries to electrically couple to the charging holster 100.

A user may remove the battery 124 from the charging holster 100 or remove the battery 810 from the flashlight 800. In some examples, the battery 124 or 810 may be replaced with a spare battery of the same or similar type. In other examples, a user may swap the battery 124 with the battery 810. In such case, the battery 124 may be inserted into the battery compartment of the barrel 802 of the flashlight 800 and provide power to the flashlight 800 and/or receive power from the charging holster 100 or external source. The battery 810 may be inserted into the battery compartment 104 of the charging holster 100 and provide power to charging holster 100, the flashlight 800, or other connected device or receive power from the flashlight 800 or another power source. In one example, a user may swap the battery 810 from the flashlight 800 with the battery 124 in the charging holster 100 after the battery 124 was recharged (partially or completely) from another power source (e.g., mains power, etc.). Swapping the battery may allow the flashlight 800 to operate for a longer period disconnected to the charging holster 100. In another example, a user may swap the battery 810 from the flashlight 800 with the battery 124 in the charging holster 100, for example, where the battery in the flashlight 800 has a greater. This may allow the charging holster 100 to provide power to additional connected devices (via e.g., a power-out interface), in some cases including, flashlight 800.

4 System Architecture

Figure 26:
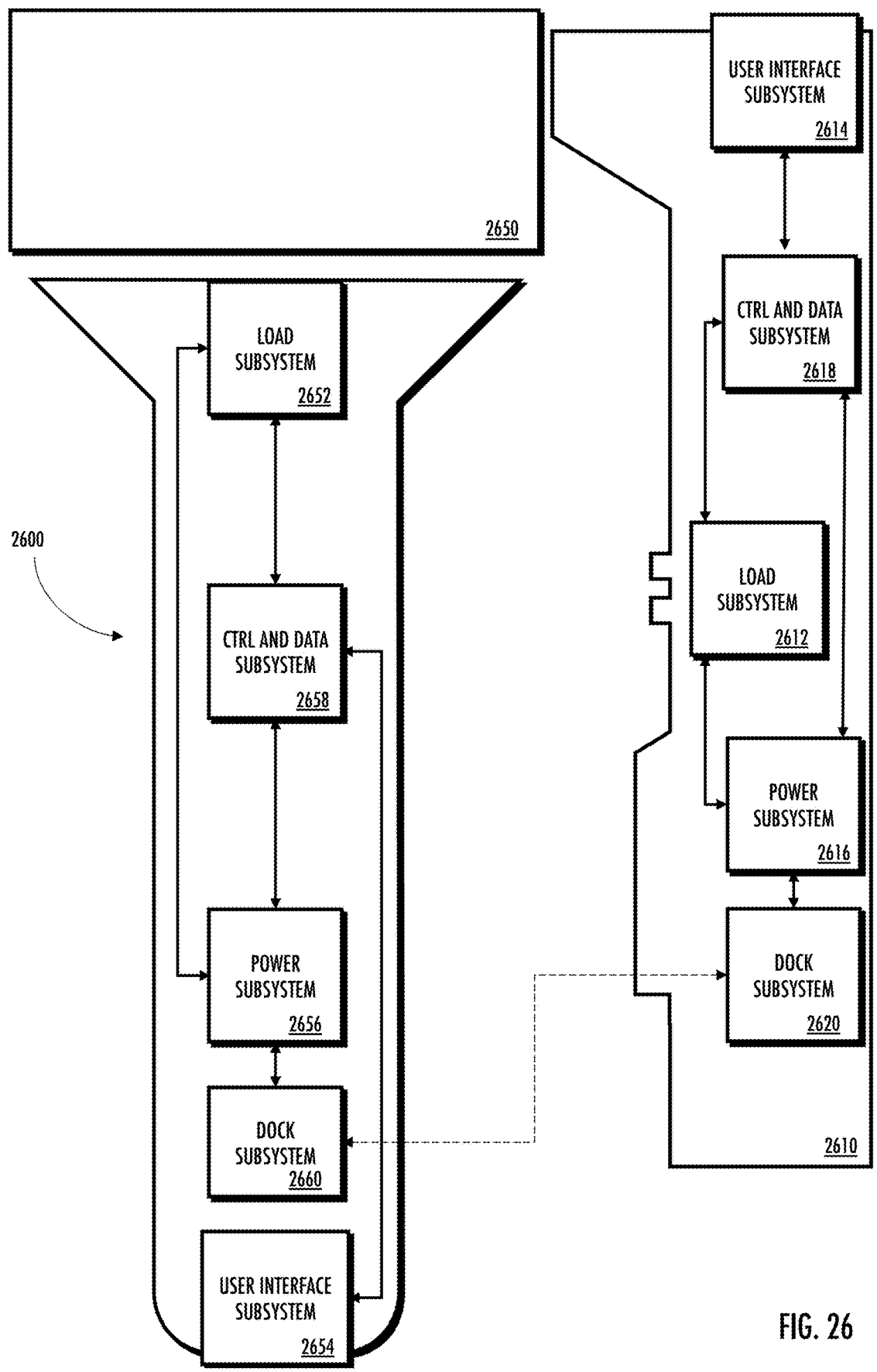
FIG. 26 illustrates a logical block diagram of one generalized system, useful in conjunction with the various techniques described herein.

FIG. 26 is a logical block diagram of an exemplary flashlight charging system 2600. The exemplary flashlight charging system 2600 includes a charging holster 2610 and a flashlight 2650.

The charging holster 2610 may include a load subsystem 2612, a user interface subsystem 2614, a power subsystem 2616, a control and data subsystem 2618, and a docking subsystem 2620, within a housing. During system operation, the power subsystem 2616 provides power from multiple different power sources with different characteristics and/or capabilities. The control and data subsystem 2618 monitors the power subsystem 2616 and/or the load subsystem 2612 and adjusts power provisioning according to the dynamic loading activity of the load subsystem 2612. Additionally, system status and user feedback may be provided to/from the user via the user interface subsystem 2614.

The flashlight 2650 may include a load subsystem 2652, a user interface subsystem 2654, a power subsystem 2656, a control and data subsystem 2658, and a docking subsystem 2660, within a housing. During system operation, the power subsystem 2656 provides power from multiple different power sources with different characteristics and/or capabilities. The control and data subsystem 2658 monitors the power subsystem 2656 and/or the load subsystem 2652 and adjusts power provisioning according to the dynamic loading activity of the load subsystem 2652. Additionally, system status and user feedback may be provided to/from the user via the user interface subsystem 2654.

In some examples, the flashlight 2650 is couplable to the charging holster 2610 for ease of storage and use. The flashlight 2650 may also be electrically coupled to the charging holster 2610 to provide power to the flashlight 2650 for charging a battery and powering lighting operation. In such examples, the flashlight 2650 acts as a load on the charging holster 2610. The flashlight 2650 may be in data communication with the charging holster 2610 such that status information of the flashlight 2650 (e.g., status of the battery, current operating mode, etc.) may be shared with the charging holster 2610 to allow the charging holster 2610 to provide power management for the flashlight 2650.

While the illustrated housing is presented in the context of a lighting device (e.g., flashlights, headlamps, lanterns, work lights, etc.) in a charging holster, the system may have broad applicability to any portable system with couplable charging capability. Such applications may include personal, industrial, financial, medical, and/or scientific devices including, e.g., radiant apparatuses (e.g., visible light, infrared, ultraviolet, etc.), acoustic systems, sensor systems (photoelectric, thermoelectric, electrochemical, electromagnetic, electromotive, etc.), electromotive systems (motors, actuators, etc.), power systems (power banks, battery chargers, etc.), and/or any other portable powered apparatus.

The following discussion provides functional descriptions for each of the logical entities of the exemplary flashlight charging system 2600. Artisans of ordinary skill in the related arts will readily appreciate that other logical entities that do the same work in substantially the same way to accomplish the same result are equivalent and may be freely interchanged. A specific discussion of the structural implementations, internal operations, design considerations, and/or alternatives, for each of the logical entities of the exemplary flashlight charging system 2600 is separately provided below.

5 Load Subsystems

Within the context of the present disclosure, the load subsystem 2612 of the charging holster 2610 consumes power that is provided from the power subsystem 2616. The load subsystem 2652 of the flashlight 2650 consumes power that is provided from the power subsystem 2656. In one aspect of the present disclosure, the load subsystem 2612 and the load subsystem 2652 dynamically varies its loads; the dynamic characteristics of the load may be monitored to select, prioritize, or otherwise inform power provisioning (controlled by the control and data subsystem 2618 of the charging holster 2610 and the control and data subsystem 2618 of the flashlight 2650).

In some examples, the load subsystem 2612 of the charging holster includes charging contacts electrically couplable to the flashlight 2650. When electrically coupled, the flashlight 2650 (or specific components of the flashlight 2650, e.g., the battery, LEDs, etc.) may act as a load managed by the load subsystem 2612. The load subsystem 2612 may manage the amount of power provided to loads including the flashlight 2650. In a specific example, the load subsystem 2612 of the charging holster 2610 may be connected to the power subsystem 2656 of the flashlight 2650.

As used herein, the term "load" refers to any device or component that consumes electrical energy to perform a specific function. A dynamic load refers to an electrical load that varies its power consumption due to its operating conditions and/or the specific function it performs. A static load refers to an electrical load that has a constant power consumption.

An electrical load may be characterized according to the voltage (measured in "volts" (Joules/Coulomb)) and current (measured in "amps", (Coulombs/second)) the load uses. Power consumption is typically measured in "watts" (volts× amps=watts (Joules/second)). Notably, power consumption is a function of impedance which has two components: resistance and reactance. Resistance measures opposition to the flow of electrical current, whereas reactance measures opposition to a change in electrical current. Reactance may be further sub-divided into inductive reactance and capacitive reactance. Inductive reactance stores energy in the form of magnetic field hysteresis; thus, the change in current "lags" the change in voltage. In contrast, capacitive reactance stores energy as differences in electrical fields thus, the change in current "leads" the change in voltage. The combination of resistance (real) and reactance (imaginary) describes a complex impedance having a magnitude and phase. Notably, reactance stores, but does not consume, power-thus, reactive components are not "dynamic loads" since they do not vary their power consumption.

Electrical systems that switch in/out portions of circuitry are one type of dynamic load behavior. For example, Pulse Width Modulation (PWM) and Pulse Density Modulation (PDM) circuits may switch on/off according to different widths or densities. Other examples include electrical subsystems that can be enabled/disabled either in whole or in part. For example, gate logic and other hardware may be enabled/disabled with clock gating and/or power gating. More generally, however, any time varying load may be substituted with equal success. For example, Pulse Amplitude Modulation (PAM) may increase/decrease impedance to affect the resulting amplitude. As another such example, variable resistances may be used to adjust current flow (e.g., potentiometers and/or rheostats) of analog circuits.

The permissible static and dynamic behavior of electrical signals may be parameterized for a load in a variety of ways. The following listing is illustrative, other load parameters may be used with equal success.

A "nominal" quantity is a specified or typical quantity (e.g., voltage, current, frequency, etc.) that an electrical or electronic component, circuit, or device is designed to operate under normal conditions. It serves as a reference value for the expected value. "Maximum" and "minimum" refer to the highest and lowest values, respectively, that a component, circuit, or device can withstand without suffering damage or exceeding its rated specifications. "Peak" and "trough" refer to the highest and lowest values, respectively, that a component, circuit, or device is designed for to maintain proper operation.

An "average" quantity characterizes a quantity over time. While "average" generally refers to an "arithmetic mean" average, other averages may be substituted with equal success. A non-limiting set of examples include: median, mode, geometric mean, harmonic mean, weighted mean, trimmed mean, etc.

An "average" quantity characterizes a quantity over time. While "average" generally refers to an "arithmetic mean" average, other averages may be substituted with equal success. A non-limiting set of examples include: median, mode, geometric mean, harmonic mean, weighted mean, trimmed mean, etc.

A "duty cycle" describes the fraction of time during which a periodic signal (such as a pulse or waveform) is in an active state compared to its total period. For example, an 80% duty cycle (sometimes also referred to as an 80/20 duty cycle) refers to a signal that is on for 80% of the cycle (and off for 20% of the duty cycle).

A "slew rate" refers to the rate at which a signal changes over time. For example, slew rates for voltages are often expressed as volts/microsecond.

A "spectral envelope" is a representation of the amplitude characteristics (magnitude) of the frequencies present in a signal or spectrum. It provides information about the dominant frequency components of a signal. A "roll-off frequency" is the point in a frequency response at which the amplitude or power of the signal begins to decrease rapidly. It is typically defined as the frequency at which the response is reduced by a certain amount, often measured in decibels.

The following discussions provide several illustrative embodiments of dynamic loads, however, artisans of ordinary skill in the related arts given the contents of the present disclosure will readily appreciate that the virtually any dynamic load may be substituted with equal success.

5.1 Transducer Components

As used herein, the term "transducer" and its linguistic derivatives refer to components that convert (transduce) energy from a first form to a second form. Forms of energy may include electrical, magnetic, chemical, mechanical, acoustic, optical, thermal, radio, etc. For example, an RF antenna is an example of an electromagnetic transducer (converting electromagnetic waves to/from electrical energy), a speaker is an example of an electroacoustic transducer (converting electrical energy to/from acoustic waves), an LED is an example of an electro-optical transducer (converting electrical energy to incoherent light), etc. Various embodiments of the load subsystem convert (transduce) electrical energy into another form to perform its task; dynamic transduction may entail dynamic loading.

In one embodiment, the load subsystem transduces electrical energy to electromagnetic radiation. EM radiation refers to oscillating electric and magnetic fields that propagate together in the same direction, perpendicular to one another. For example, the load subsystem may be a light module that generates visible light. The light module may include a bulb (incandescent, halogen), light emitting diode (LED), gas-discharge lamp (fluorescent tubes, neon, sodium vapor), lasers, or other light generating device. A bulb includes a wire filament enclosed in a vacuum or inert gas; the resistance of the filament is used to convert electrical energy to heat and light. An LED is composed of a diode junction manufactured from semiconductors with specific electroluminescent properties (e.g., gallium arsenide (GaAs), gallium phosphide (GaP), etc. When electrical energy is applied to the diode junction, electrons are forced to combine with electron holes; this process converts some electrons to photons (light). Gas-discharge lights pass electrical energy through ionized gasses; the ionized gases have quantum energy states so excess energy is released as EM radiation. The EM radiation is absorbed by a phosphor coating, which re-emits it as visible light. Lasers (light amplification by stimulated emission of radiation) use electrical energy to stimulate a gain medium (e.g., gas, liquid, solid); once energized, some atoms of the gain medium emit radiation. The emitted radiation triggers other atoms of the gain medium to emit more radiation; resulting in a rapid amplification of coherent light. The gain medium lies in a resonant cavity of the laser which allows continued amplification even as some portion of the light is output.

In addition to the light generating element, the light module may incorporate passive lenses, diffusers, reflectors, waveguides, and/or any other components or combinations of components configured to direct or disperse the light. For example, lenses are typically manufactured from a transmission medium (e.g., glass, acrylic, polycarbonate, etc.) which has been physically formed to bend (refract) light as it passes through. The lens physical shape may be convex (that causes light to converge), concave (that causes light to diverge), or a piecewise combination. In some applications, multiple lenses may be used in combination to provide refraction characteristics that are not possible (or practical) to implement with a single lens. Diffusers scatter, spread, and/or soften light as it passes through. Examples of diffusers include e.g. diffuser films, prisms, or translucent materials (e.g., frosted glass/acrylic, etc.). Reflectors reflect some (or all) of the light; reflectors are often used to direct light in a particular direction. Reflectors can be made from a wide range of materials, including metals, glass, plastics, and specialized coatings designed for specific wavelengths or applications. The design and geometry of a reflector determine its reflective properties and how it redirects or concentrates light. Waveguides use internal reflection to guide and confine light from one point to another; typical examples of waveguides include e.g. fiber optics for light as well as microwave waveguides and radio waveguides.

More generally, while the foregoing discussion is presented in the context of visible light applications (e.g., lanterns, flashlights, head lamps, work lights, etc.), any EM radiator (and associated peripherals) may be substituted with equal success. EM radiation spans a very wide spectrum from e.g., radio waves, microwaves, infrared (IR) or heat, visible light, ultraviolet (UV), x-rays, gamma rays, etc. Such devices may include e.g., telecommunications radios, microwave transmitters/ovens, IR transmitters/elements, UV lamps, X-ray lamps, etc.

In one embodiment, the load subsystems 2612 and 2652 transduce electrical energy to acoustic waves. An acoustic wave is a mechanical wave that propagates through a physical medium (air, water, solids, etc.) by causing particles in the medium to oscillate or vibrate. In one implementation, the load subsystems 2612 and 2652 include a moving-coil speaker module that generates audible sound. Such speakers include a diaphragm (cone) that is attached to a coil, and magnet. When an electrical current passes through the coil, the coil generates a magnetic field that interacts with the magnet, causing the coil (and diaphragm) to move. Oscillating the diaphragm within certain frequency ranges and at sufficient magnitudes results in audible sound. Other examples of speakers include electrostatic speakers and planar magnetic speakers. Electrostatic speakers move an electrically charged diaphragm between perforated metal plates by changing the electrical charge of the plates. Planar magnetic speakers move a magnetic diaphragm using an electrically induced magnetic field. Each of these speaker technologies transduces electrical energy into acoustic waves.

Audio devices may include without limitation: audio/visual (AV) players (e.g., laptops, portable stereos, etc.), personal communication devices (e.g., walkie-talkies, smartphones, etc.), home/professional entertainment systems, public address systems, voice assistants, and/or any other personal, industrial, financial, medical, and/or scientific devices that employ audible sound.

Furthermore, much like light, acoustic waves exist on a spectrum that includes infrasound, audible sound, and ultrasound. While the foregoing selection describes audible acoustic applications, non-audible acoustic applications may use other forms of transduction. For example, ultrasonic transducers apply electrical current to piezo-electric elements to vibrate and generate ultrasonic acoustic waves. Ultrasonic waves are used for a variety of medical and industrial applications. Similarly, infrasonic waves may be generated by motors/vibrators; infrasound travels well in liquid/solid mediums and has applications in seismology and/or petroleum exploration, etc.

In one embodiment, the load subsystems 2612 and 2652 convert electrical energy to mechanical movement. Typically, electro-mechanical movement uses electrical current in combination with permanent magnets to create attraction/repulsion forces. These techniques are commonly used in relays, solenoids, electric motors, stepper motors, linear actuators, servo motors, etc. Mechanical movement may include regular movements such as linear motion, reciprocating motion, rotary motion, oscillatory motion, as well as irregular movements such as cam-based motion, linkages, and eccentric motion.

Electro-mechanical devices may include without limitation: consumer electronics, hand tools and power tools (e.g., drills, screwdrivers, saws, sanders, routers, impact drivers, sprayers, heat guns, nail guns, rotary tools, random orbital sanders, and/or any other similar tools), and/or any other personal, industrial, financial, medical, and/or scientific devices that employ mechanical motion. While the foregoing selection describes electro-mechanical applications for hand-operated applications, artisans of ordinary skill in the related arts will readily appreciate that electro-mechanical motion may also be used in robotics, transportation, industrial automation, and/or drone-based applications. Such applications may also incorporate electro-mechanical transducers of extraordinarily small (or large) scale, such as piezo-electricity, nanotechnologies, etc.

While the foregoing discussion provides several illustrative transduction technologies, virtually any transduction technology with dynamic loading may be substituted with equal success, given the contents of the present disclosure.

5.2 Signal Processing Components

Aspects of the present disclosure may be used in conjunction with dynamic loads of signal processing. Signal processing refers to techniques that manipulate, analyze, and interpret electrical signals, which are representations of data in either analog or digital form. Functionally, semiconductors consume power during operation due to internal resistances. As a result, the dynamic loads associated with signal processing are a function of e.g., processing complexity (e.g., data size, compute cycles, memory accesses, etc.), dynamic behavior (e.g., enable/disable, load balancing, etc.), and/or application considerations (e.g., real-time budgets, best-effort processing, etc.).

As used herein, the term "real-time" refers to tasks that must be performed within definitive time constraints; for example, a video camera must capture each frame of video at a specific rate of capture. As used herein, the term "near real-time" refers to tasks that must be performed within definitive time constraints once started; for example, a smart phone must render each frame of video at its specific rate of display, however some queueing time may be allotted for buffering. As used herein, "best effort" refers to tasks that can be handled with variable bit rates and/or latency. As but one such example, a user that wants to view a video on their smart phone can wait for the smart phone to queue and post-process video.

In one embodiment, the load subsystems 2612 and 2652 each include a signal processor that manipulates electrical signals in the analog domain. In other words, information is conveyed via voltage and/or current. Functionally, analog processing may consume power to amplify/attenuate and/or synthesize intermediate signals and waveforms. Examples of analog signal processing include without limitation: amplification/attenuation, filtering, modulation/demodulation, signal conditioning, analog-to-digital (ADC)/digital-to-analog (DAC) conversion, automatic gain/frequency control (AGC/AFC), waveform synthesis, voltage/current regulation, mixing, phase shifting, isolation, equalization, and/or any other such operation. Analog signal processing is commonly used in sensors, telecommunications, audio processing, instrumentation, control, and any number of digital signal processing applications.

In one embodiment, the load subsystems 2612 and 2652 each include a signal processor that switches between operational modes (enables/disables circuitry) to perform signal processing. For example, a multicore processor may shift processing burden between cores (disabling a first core, transferring data, enabling a second core). Similarly, a processor may enable/disable processing elements between different power states (idle, low power, sleep, etc.). As another example, modems often wake-up to respond to communication requests (which could occur at any time), and sleep to save power when not in use.

As a related corollary, in "fixed-width" processing embodiments, data is processed using a fixed number of bits, such as 8, 16, 32, or 64 bits, etc. However, some embodiments may support "variable-width" processing and/or variable-length encoding which dynamically adjust the number of bits used to represent and process data based on the needs of a particular computation. This can be particularly useful for computational and/or memory efficiency. In other words, unnecessary computations may be avoided and/or unnecessary precision can be disregarded (e.g., saving memory space, reducing data transfers, etc.). Variable-width processing may be particularly useful in applications where lossy data is acceptable; examples include communication protocols, media playback, and/or neural network computing.

In one embodiment, the load subsystems 2612 and 2652 each include a signal processor that adjusts the operation of its gate-level circuitry. As a brief aside, gate-level circuitry refers to digital electronic circuits at the most fundamental level, where digital signals are represented with electrical voltages and drive currents (e.g., a Boolean "0" corresponds to GND voltage, a Boolean "1" corresponds to VCC voltage, etc.). So-called combinatorial logic emulates logical gates (e.g., AND gates, OR gates, NOT gates, NAND gates, NOR gates, XOR gates, XNOR gates, etc.). One example of an operational change that affects the power consumption of the signal processor is the voltage level (which may affect the robustness and reliability of transitions between logical levels). Sequential gates store logical values as electrical charges (e.g., registers, flip-flops, memory, and/or any other non-transitory computer-readable media). Operational changes that affect sequential gate logic include clock rate and/or drive current; in some cases, increasing/decreasing drive current may be used to enable faster clock rates and/or longer signaling distances.

The aforementioned techniques (switching operational modes, changing gate-level circuitry, and/or changing data sizes) are used in many computing devices including without limitation e.g., controllers, general-purpose processors, graphics processors (GPUs), neural network processors (NPUs), image signal processors (ISPs), digital signal processors (DSPs), modems, networking processors, field programmable gate arrays (FPGAs), codecs, application specific integrated circuits (ASICs), and/or any other semiconductor logic. Such computing devices may be combined with other circuitry (e.g., data storage circuitry, sensors, other signal processing components) on one or more printed circuit boards (PCBs) within a device. Such components are often found in devices such as: computers, smartphones, laptops, terminals, servers, workstations, etc. While the foregoing discussion is primarily presented in the context of embedded and portable devices, the concepts may be broadly applied to any signal processing application that may need to dynamically adjust operation based on its power source.

5.3 Energy Transfer Components

Aspects of the present disclosure may be used in conjunction with energy transfer applications. Energy transfer technologies move energy from one device to another device, or store energy in another form for storage/delivery. The conservation of energy is a fundamental principle of physics that prevents energy from being created or destroyed in a closed system (e.g., the energy donor and energy recipient), however practical implementations have some efficiency losses due thermal waste, frictional losses, etc. Examples of energy transfer applications include for example: charging a battery, wireless power transfer, etc.

The energy transfer techniques described above are used in portable chargers, battery packs, power banks, jump starters, generators, and/or other power sources. In many cases, these devices may charge other devices such as smartphones, laptops, cameras, hand tools, power tools, car batteries, and/or other powered devices. These power storage devices are commonly used by working professionals, travelers, outdoor enthusiasts, and/or any other work application where access to power is limited.

In one embodiment, the load subsystem 2612 of the charging holster 2610 delivers power to another device (e.g., the flashlight 2650). In one embodiment, the load subsystem 2652 of the flashlight 2650 delivers power to another device (e.g., an attached device). For example, the charging holster 2610 may provide energy to another device (or devices) via a wired or wireless interface. Examples of wired interfaces include, without limitation: Universal Serial Bus (USB) and its derivatives, Lightning®/Magsafe®, charging contacts and charging rings, and any other proprietary charging interfaces, barrel connectors and AC plugs, etc. Wireless charging interfaces include, without limitation: inductive charging, magnetic resonance charging, RF charging, ultrasonic charging, beamforming and/or resonant coupling, etc. In some examples, the charging holster 2610 may provide energy to multiple external devices. For example, the flashlight 2650 may be coupled to charging contacts on the charging holster 2610 and a headlamp may be connected via a USB interface on the charging holster 2610.

6 User Interface Subsystem

Functionally, the user interface subsystems 2614 and 2654 convey (outputs) information to the user in visual, audible, and/or haptic form. Similarly, the user inputs information via physical or virtual interactions. The following discussions provide several illustrative embodiments of user interfaces, however, artisans of ordinary skill in the related arts given the contents of the present disclosure will readily appreciate that the virtually any user interface may be substituted with equal success.

User interfaces often incorporate mechanical elements including, without limitation: buttons, switches, knobs, levers, dials, joysticks, keyboards, mice, pedals, handles, and/or any other physical components that users may interact with to provide information to the system. For example, a user may press a physical button, click on an icon using a mouse, input text via a keyboard, etc.

User interfaces often incorporate visual elements, including without limitation: light emitting diodes (LEDs) and variants (e.g., OLEDs, MicroLEDs, etc.), liquid crystal displays (LCDs) and their variants (quantum dot displays (QLED), etc.), e-paper, cathode ray tube (CRT), projection displays, etc. In many cases, these visual elements may be used alone, or in conjunction with other modalities of input/output, for communication. As but one example, a set of light emitting diodes (LEDs) may be used to convey the estimated remaining voltage and charge of a corresponding set of batteries, based on position, color, intensity of illumination, and/or rate of blinking, etc. As another example, a graphical user interface using a virtual "desktop" may be displayed on a screen or touchscreen. The user may interact with icons on the desktop using a mouse and input text commands with a keyboard to see current power status (e.g., clicking on a battery icon opens a current estimated remaining voltage and charge for each battery, etc.).

Some user interfaces incorporate sound and/or audible information. For example, sounds and/or audio may be presented to the user (or captured) via a microphone and speaker assembly. In some situations, the user may be able to interact with the device via voice commands to enable hands-free operation.

Certain user interfaces incorporate motion and/or spatial information. For example, rumble boxes and/or other vibration media may provide haptic signaling. Cameras, accelerometers, gyroscopes, and/or magnetometers may be used to sense the user's physical motion and/or orientation to enable gesture-based inputs.

Most user interfaces incorporate multiple modalities of input. For example, augmented reality (AR) and/or virtual reality (VR) environments have been used in head-mounted apparatus (helmet, glasses, etc.). Such devices often incorporate visual, audio, and/or haptic information to the user.

Within the context of the present disclosure, system status and user feedback may be provided to/from the user via the user interface subsystem 2614 (controlled by the control and data subsystem 2618) of the charging holster 2610 and/or the user interface subsystem 2654 (controlled by the control and data subsystem 2658) of the flashlight 2650. In some embodiments, a single user interface may be used to provide multiple statuses; e.g., the charging holster may provide status for the holster and its connected flashlight, or vice versa.

7 Power Subsystem

As a brief aside, a "closed" electrical circuit provides a path for electric current to flow from a power source across a load; an "open" electrical circuit means that the path from a power source to a load has a gap which prevents the flow of electrical current. As previously alluded to, early electronics were designed for just a single power source and often directly connected power sources to the load, e.g., a battery might directly drive a bulb. Selectively providing power from multiple different power sources requires careful management of both the load requirements and the source output to prevent e.g., voltage/current mismatch, chemistry rate mismatch, capacity mismatch, etc.

Functionally, the power subsystems 2616 and 2656 connect one or more power sources to the (respective) load subsystem 2612 or 2652. In addition, the power subsystems 2616 and 2656 may also provide conditioning to compensate for differences between the required and provisioned electrical characteristics. For example, the power subsystems 2616 and 2656 may ensure that the voltage and current provided from the selected batteries, solar cell, fuel generator, outlet, charging device, etc. match the load requirements in terms of nominal values, rate of use, frequency, etc.

Much like the load subsystems 2612 and 2652, the power sources of a power subsystems 2616 and 2656 may also be characterized with source parameters. For example, source parameters for a battery might include its nominal voltage, maximum/minimum voltage, maximum current draw, etc. As a practical matter, many types of power sources do not provide information about their internal operations; for example, a battery may have a nominal voltage but the remaining charge is unknown. Similarly, a solar cell might provide power according to light which may vary, or an AC wall circuit might be shared with other loads.

Various embodiments of the present disclosure further characterize the power sources of a power subsystem with characteristic functions. As used herein, the term "characteristic function" and its linguistic derivatives refers to a relationship between known and unknown quantities. For example, the measurable initial voltage across the terminals of a battery may be used to estimate the unknown remaining charge of the battery. Similarly, the voltage/current and/or line noise of an AC power supply may be used to characterize the unknown loads that are sharing the circuit, etc. Characteristic functions may be empirically determined, based on historic data, defined by manufacturer, user, vendor, etc. More directly, any technique for estimating an unknown quantity from observable quantities may be substituted with equal success.

Within the context of the present disclosure, the power subsystem 2616 provides power to the load subsystem 2612 of the charging holster 2610. The power subsystem 2656 provides power to the load subsystem 2652 of the flashlight 2650. During operation, the power subsystems 2616 and 2656 may also provide information to their respective the control and data subsystems 2618 and 2658; this information may be used to monitor the status of the power subsystem and/or adjust operation. During charging/use, the load subsystem 2612 of the charging holster may provide power to the power subsystem 2656 of the flashlight 2650 (as controlled by the control and data subsystems 2618 and 2658).

7.1 Power Sources and Storage

Power sources may be characterized by their output voltage and maximum supported current draw. As previously noted, power sources cannot provide voltage/current according to idealized curves. For example, a typical battery may have been specified to a nominal voltage and total capacity (number of Coulombs), however, limitations of the battery chemistry and parasitic impedances will affect the actual maximum output current. Similar limitations exist for other forms of power generation (e.g., solar power, outlet power, fuel cells, etc.). Thus, different power sources may have different utility for meeting the dynamic needs of the load subsystem.

7.1.1 Single-Use and Rechargeable Batteries

Compared to rechargeable batteries, single-use batteries store charge longer in extreme temperatures and when not in use (the so-called "self-discharge rate" is the rate at which the stored charge in a battery is reduced due to internal chemical reactions of the battery). Certain types of alkaline batteries, for example, have a shelf life of ten years. Single-use batteries are therefore well suited for emergency-use applications.

Single-use batteries must be replaced after use, thus a cost comparison of single-use batteries and their rechargeable counterparts should consider replacement cost and access to recharging power. Many high-power output products today consume single-use batteries in just a few hours, and performance is frequently inferior to rechargeable batteries at low battery life. Replacement costs can quickly eclipse the low per unit cost of single-use batteries. Further, rechargeable batteries, while having a larger up-front cost than single-use batteries, can be recharged with relatively inexpensive power from, e.g., an outlet. As a result, rechargeable batteries allow for more cost-effective use over their lifetime.

Most batteries use one or more electrochemical cells to store energy as a chemical potential between reactants. During discharge, a chemical reaction converts high-energy reactants to lower-energy products, and the free-energy difference is delivered to the external circuit as electrical energy. Rechargeable battery chemistries allow for both charging and discharging cycles (e.g., charging the cell reverses the chemical process). Batteries come in a variety of sizes and chemistries. Examples of battery chemistries include, without limitation: alkaline, lithium-ion, lead-acid, nickel-cadmium, nickel-metal hydride, lithium polymer, zinc carbon, silver-oxide, zinc-air, sodium-ion, etc. Commonly available single-use sizes include without limitation: AA, AAA, C, D, etc. Rechargeable batteries are available in the legacy cell formats, but also have new formats such as: 10440, 14500, 18650, 26500, 32600, etc.

In one embodiment, the power subsystems 2616 and 2656 use batteries to store power. In some variants, the charging holster 2610 and the flashlight 2650 may house multiple power sources of different types and sizes. For example, a charging holster or flashlight might have a combination of rechargeable and single-use (dry cell) batteries. The rechargeable batteries may be removable or permanently affixed. The batteries may be stored and used in a removable battery cartridge (housing). While some battery cells may each provide approximately 1.5V, the differences in their individual capacities, discharge rates, and chemistries may be suited to certain tasks. For example, the AA cells may be useful for low intensity, short duration tasks (e.g., low illumination settings, soft background music, etc.). D cells may allow for high intensity, long duration tasks (e.g., high intensity lights, klaxon alarms, public address volumes, etc.). The rechargeable cells may be suitable to offload tasks and lengthen the usable life of the single-use cells. In some cases, the rechargeable cells may be charged in device when external power is available e.g., via holster, solar cells, AC adaptors for outlets, etc.

In some implementations, the power subsystems 2616 and 2656 may incorporate internal batteries. Internal batteries are an integral part of the system's structure and are typically not removeable without e.g., specialized tools, voiding the device warranty, etc. Internal batteries are often used to e.g., support specialized power requirements, enable aggressive design form factors, incorporate proprietary technologies, and/or to reduce the cost of single-use/disposable type devices. In some implementations, the power subsystems 2616 and 2656 may include housings and connection interfaces to allow for external battery connections; this allows the user to remove and replace batteries. Still other implementations may include both internal and external battery components.

While the foregoing discussion is presented in the context of electro-chemical cells, the concepts are broadly applicable to any power storage apparatus. Examples of other electro-chemical techniques include, e.g., generators and fuel cells that consume fuel to generate electrical energy. Furthermore, the power subsystems 2616 and 2656 may incorporate other sources of power such as electro-optical cells (solar cells), electrical interfaces (e.g., wall socket power), and/or any other source of power.

7.1.2 Dynamic Loading of Power Sources

Some products have implemented dynamic loading capabilities-dynamic loading potentially offers better performance, longer battery life, and/or improved functionality. So-called Pulse Width Modulation (PWM) is one example of a dynamic loading strategy. Consider a PWM implementation that powers a Light Emitting Diode (LED) according to a selectable duty cycle. Specifically, the anode of the LED may be connected to the positive end of the battery source and the cathode of the LED may be connected to the drain of an N-Channel metal-oxide-semiconductor field-effect transistor (NMOSFET) switch. The source of the NMOSFET is connected to ground, and the gate is opened and closed by the PWM signal. The perceived brightness of the light is based on the duty cycle, e.g., 100% duty is the maximum brightness, 0% duty is off. Artisans of ordinary skill in the related arts will readily appreciate that other dynamic loading schemes provide similar behavior; these schemes may include e.g., Pulse Density Modulation (PDM), Pulse Amplitude Modulation (PAM), and other duty cycle-based modulation techniques.

Dynamic loading schemes provide substantial benefits over resistive dimming alternatives. NMOSFETs do not burn power during their off cycle which reduces power consumption and heating; this allows devices to stay cooler and last longer. Also, an NMOSFET is cheaper and smaller compared to power resistors. Unfortunately, these savings come at the cost of voltage stability, may also increase noise in the system.

Figure 24:
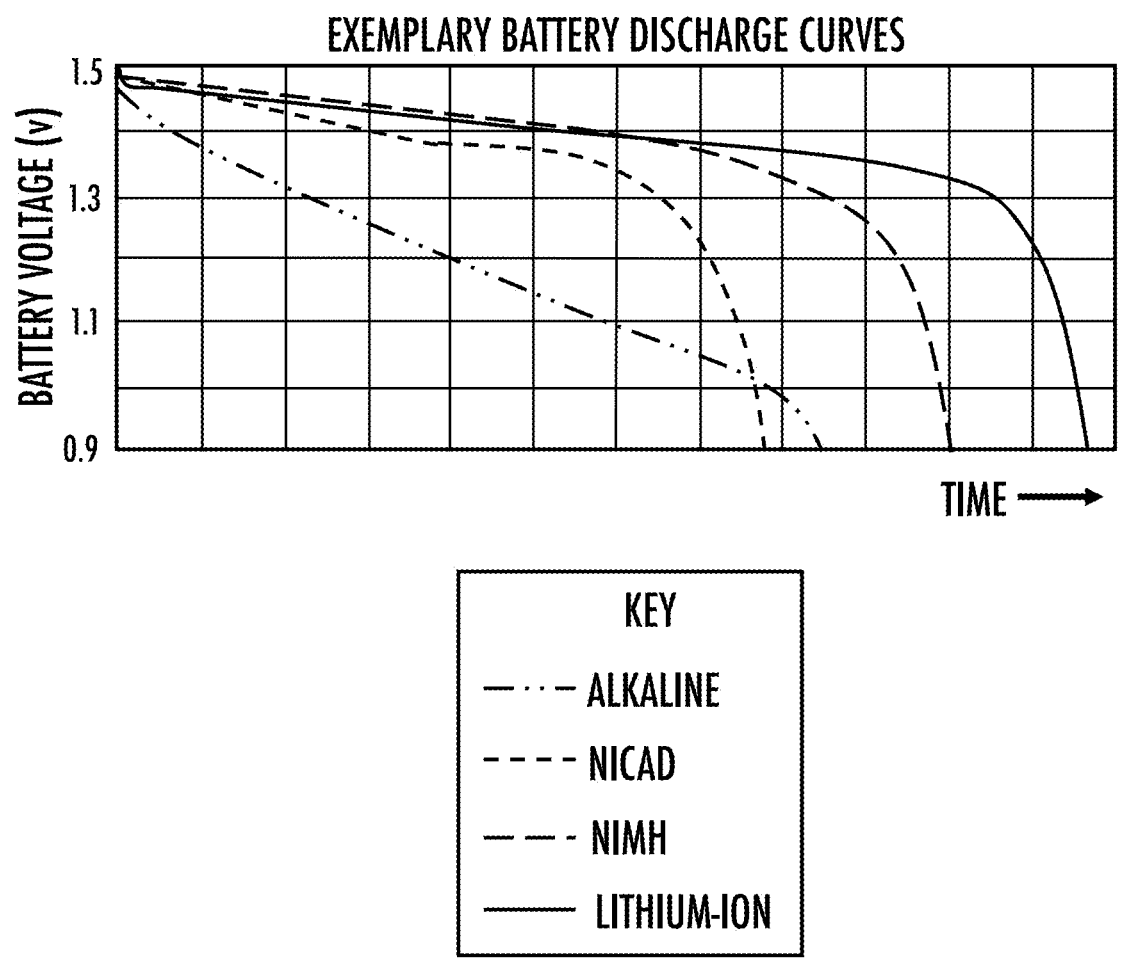
FIG. 24 is a graph illustrating discharge curves for single-use and rechargeable batteries.

As an important tangent, FIG. 24 is a graph illustrating exemplary discharge curves for single-use and rechargeable batteries. The graph illustrates the discharge curves (voltage) of four types of battery chemistries over time of use. Alkaline manganese dioxide (alkaline) batteries are single-use batteries. Nickel-cadmium (NiCAD) batteries, nickel-metal hydride (NiMH) batteries and lithium-ion batteries are rechargeable batteries. Even though all battery chemistries lose voltage over time, alkaline batteries (which are the most popular type of single-use battery) lose voltage at an almost constant rate over the span of discharge. Rechargeable battery chemistries lose voltage at a far slower rate, and drop-off before the battery is depleted. Conventional wisdom suggests that the differences in discharge rates means that single-use and rechargeable cells should not be directly electrically coupled together, since this may cause the cells to load one another unevenly and/or may reduce output, damage the cells, and in extreme cases, cause rupture and cell leakage.

The relatively constant rate of discharge for alkaline batteries simplifies battery-life determination compared to other battery chemistries; the remaining alkaline battery life can be directly estimated based on the output voltage (when not under load). In contrast, rechargeable battery chemistries can provide a relatively more consistent voltage level but may require more complex battery life determination (e.g., based on draw, temperature, usage, etc.).

Figure 25:
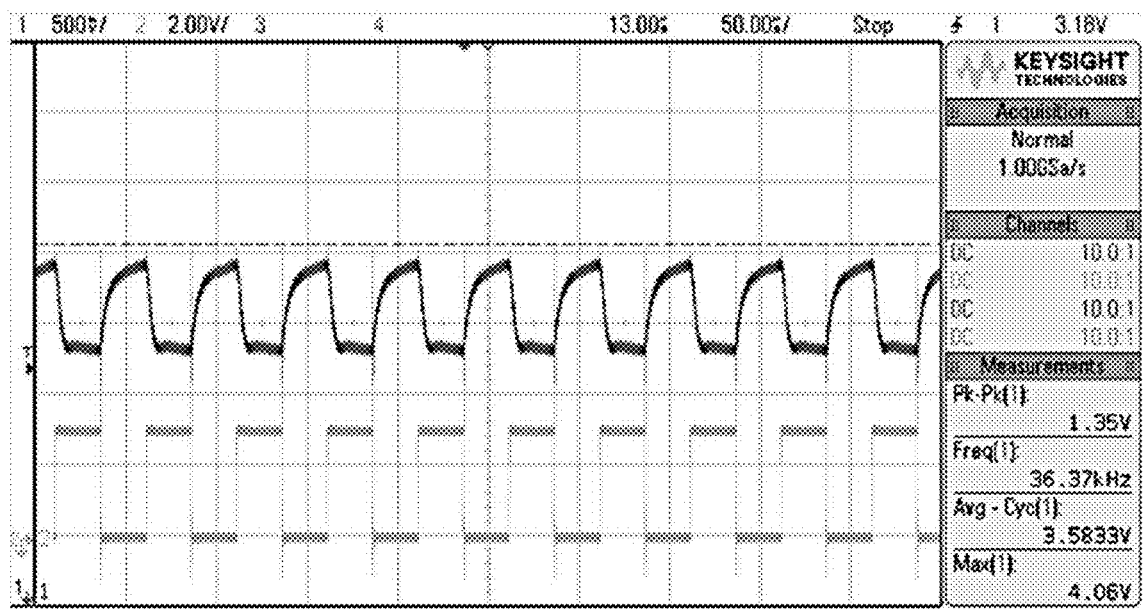
FIG. 25 illustrates voltage measurements for a Pulse Width Modulated (PWM) Light Emitting Diode (LED), useful to illustrate battery capacity measurements under dynamic loading conditions.
Figure 25:
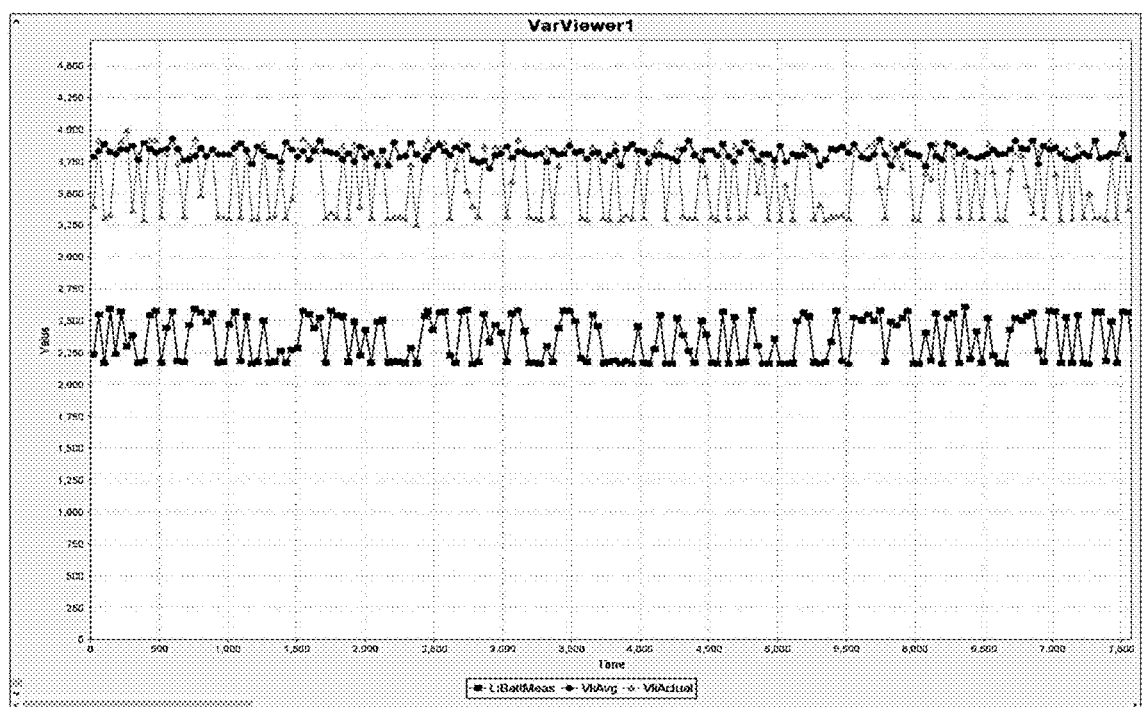

FIG. 25 shows a PWM LED implementation useful to illustrate battery capacity measurements under dynamic loading conditions. As shown, an NMOSFET gate is driven on/off at a 50% duty cycle. The battery and circuitry may also have internal resistances (R) and capacitances (C) which affect the rising and falling edges; for example, a square wave input will generate a rounded wave as the resistor-capacitor (RC) circuit charges and discharges (this effect may also be referred to as "$1^{st}$ order decay").

Battery capacity can be accurately measured based on Coulomb counting and battery voltage measurements. Unfortunately, these solutions are often cost prohibitive for low-cost applications. More cost-effective alternatives estimate the remaining charge based on the known discharge curve of the battery chemistry (such as was depicted in FIG. 24) and voltage measurements (using an analog digital converter (ADC)). Historically, most low-cost devices are designed for static loading, thus estimation has been an acceptable design choice.

Notably, static estimation techniques cannot be used under dynamic loading, since voltage is directly affected by the load (e.g., V=iR, i=C dV/dt, and/or any impedance.) A PWM driven NMOSFET results in highly variable voltage readings that present a challenge in estimating remaining battery capacity. As shown in FIG. 25, directly sampling the 50% duty cycle may capture an off-phase or the RC decay. Typically, measurements at ~50% duty cycle have the maximum amount of variation in the battery voltage; however, this may also vary based on current draw, sampling rate, etc.

For example, large swings in current draw may cause erratic RC decay readings; similarly, irregular voltage sampling may coincidentally capture more off-phase measurements.

One scheme for dynamically estimating remaining battery capacity compares a "rolling window" of voltage measurements against characteristic discharge cycles for different duty cycles. The sampling rate of the battery measurement circuitry and the duty cycle are unlikely to exactly align. Different frequencies are orthogonal to one another within the frequency domain and will constructively and destructively interfere with one another according to a "beat frequency." However, time averaging the varying voltage can be used to filter out the non-DC (direct current) frequencies, leaving only a non-zero DC voltage. Even though the non-zero voltage is not a direct measurement of voltage, it may be used to characterize the voltage discharge curve for that combination of duty cycle and sample rate. While the foregoing technique uses a rolling window calculation, artisans of ordinary skill in the related arts will readily appreciate that a variety of other calculations may be substituted with equal success. Such other techniques may include time averaging, filtering, root-mean-square calculations, multiply-accumulate, and/or any other calculation that generates a characteristic non-zero value for a dynamic input.

More directly, battery voltage measurement data may be taken during a full discharge cycle at several different fixed PWM duty cycle values. Then, a "characteristic function" that describes the relationship between measured voltage and remaining battery capacity is determined based on one or more of: duty cycle, sample rate, battery chemistry, battery numerosity, battery configuration (parallel, series, etc.), or any other operational parameter. The characteristic functions can be stored within a device to enable subsequent determination of the specific battery capacity threshold based on the measured voltage.

In one embodiment, battery capacity estimation based on characteristic functions can be used within a holster or a flashlight. In such implementations, characteristic functions may be stored into the monitoring logic for battery capacity estimation. Specifically, the characteristic functions are measured and calculated for the charging holster 100, at 100%, 75%, 50% and 25% duty cycles using a specified sample rate (e.g., ~40 Hz). The characteristic functions correspond to each of the different battery types used by the charging holster or the flashlight—for example, each of the 3.7V lithium-ion batteries (rechargeable) or dry cell/single use batteries would have different characteristic functions. During operation, the monitoring logic may determine its battery configuration and collect time averaged battery voltage measurements. The monitoring logic may use the measured voltage to look-up the estimated remaining battery capacity based on the specific characteristic function for the duty cycle, sample rate, battery configuration, operational mode, and/or any other relevant parameter. The estimated remaining battery capacity may also be used to calculate a rate of change in the remaining battery capacity—this rate of change corresponds to the estimated current draw. The estimated remaining battery capacity and rate of change are collectively referred to throughout as the "usage estimates." The usage estimates can be provided to the user via user interface logic used to, e.g., indicate the remaining capacity and/or current draw on the indicator LEDs. In some variants, the monitoring logic may also inform the power management logic; for example, the remaining capacity and/or current draw may be used by the power management logic to select an appropriate power source.

In one specific variant, the time averaged battery voltage measurements are calculated over a rolling window of values (e.g., 4, 8, 16, 32-value average, etc.). In some variants, the device logic (hardware, firmware, or software) may use a "ratcheting" level that prevents misleading behavior of calculating remaining charge in the battery. In other words, the indicator LEDs cannot display a rise above a breached lower threshold until e.g., a battery has been changed/recharged or otherwise reset. For example, once the remaining capacity has fallen from 75% to 50%, the device logic will cap the subsequent readings to 50%. The device logic will only re-enable the 100% and 75% levels after a power cycle, batteries change (or charged), etc.

In some embodiments, the user interface logic provides a continuous read-out (to, e.g., the indicator LEDs). Other embodiments may allow the user to selectively check the battery usage estimates only "as-needed." For example, all LED rows may be only momentarily lit when the user presses the ON switch (e.g., power switch), or a user may be able to individually check the power for only one of the power sources (e.g., a small push button may allow a user to check the status of the battery, etc.). Still other implementations may allow display status briefly at the start of and/or periodically during, a specific operating mode.

For example, connecting the flashlight to the charging holster may draw current from the battery of the charging holster to start, and flash the status every minute (via the indicator LEDs on either the holster or the flashlight). Once the battery of the charging holster is depleted, the PCB may switch the flashlight to another power source (e.g., battery, mains power/USB charging via the charging port, solar power, etc.)-status may flash every minute via a different set of indicator LEDs, etc.

More generally, the user interface logic of the PCB and indicator LEDs allows a user to determine the ongoing usage and remaining capacity for any one of the power sources. In some cases, the user may be alerted as to when to insert the flashlight into the charging holster, change batteries, switch power sources, and/or reduce usage. While the foregoing discussion is presented in the context of a specific arrangement and/or color code of LEDs, other arrangements/color codes, as well as other user interface schemes (e.g. audible and/or haptic) may be substituted with equal success (as discussed above with respect to indicator LEDs).

While the foregoing discussion is presented in the context of a specific arrangement and/or color code of LEDs, other arrangements/color codes may be substituted with equal success. Notably, any number of LEDs may be used to signify capacity according to any specific granularity. As one example, 10 LEDs may be used to provide 10% increments (a linear scale). In another example, 4 LEDs may be used to provide logarithmic scale increments (e.g., 10%, 25%, 50%, 100%). Different colors may also be used e.g., red, orange, yellow, green, blue, indigo, violet, etc. to represent different current draws. Still other variants may switch the representation e.g., the color may indicate the percentage left, the number of lit LEDs may represent the current draw.

While the foregoing is described in the context of an on-charging holster visual display, other user interface schemes may be substituted with equal success. In some cases, the notifications may be audible and/or haptic. For example, beeps at different note pitches may be used to convey usage estimates. As but one such example, the number of beeps may indicate remaining capacity e.g., four beeps may indicate 100%, three beeps may indicate 75%, etc. The pitch of the beeps may indicate current draw e.g., 440 Hz ($A_4$ note) may indicate low/no draw, 523.25 Hz ($C_5$ note) may indicate moderate draw, etc. As another example, a "rumble box" may use similar numerosity/frequency schemes to convey information in a tactile modality. In yet other schemes, usage estimates may be wirelessly transmitted to a remote device (smart phone or laptop) that can remotely notify the user according to an application user interface. A wide variety of other user experience (UX) may be substituted with equal success.

7.2 Protection Circuitry

Dynamic loading may introduce undesirable harmonics in either the power sources themselves or the load they are connected to. As a related note, AC power from wall outlets may have residual harmonics and/or noise (which may even survive AC/DC conversion). Examples of undesirable effects that may be introduced by harmonics may include e.g., overshoot/undershoot, noise, interference, fluctuations, etc. In a separate but related tangent, directly coupling different power sources together (without additional power management logic) may create voltage mismatches that damage other circuitry or lead to cell premature failure, excessive discharge, overheating, leakage, and eventually rupture. In view of these issues, power conditioning circuitry may be used to protect the load subsystems 2612 and 2652 and/or protection circuitry may be used to protect the power sources from one another.

Various embodiments of the present disclosure may incorporate power conditioning techniques to ensure that sourced power does not exceed acceptable tolerances, the rate of change does not exceed acceptable tolerances, and has (or does not have) certain frequency characteristics. As but one example, voltage and/or current regulation may ensure that overvoltage/undervoltage does not damage the load subsystem. Furthermore, additional resistance, capacitance, and/or inductance may be added to filter out problematic resonant frequencies. Non-linear components (such as Zener diodes, etc.) may also be used to ensure that excess power is diverted from sensitive circuits.

Certain harmonics may interfere with the normal operation of internal (or external) circuits. For example, duty cycle-based circuitry may introduce noise into the clocking signals of a nearby processor resulting in timing errors, etc. In some cases, certain frequencies are necessary for circuit operation. For example, some clock circuitry may use 60 Hz (from AC outlet power) to calculate timing; but synthesizing a 60 Hz power signal from battery-based power sources may not match the expected frequency content. Thus, frequency regulation may be used to stabilize frequencies, or synthesize additional frequencies.

More generally, artisans of ordinary skill in the related arts, given the contents of the present disclosure, will readily appreciate that any number of different power conditioning circuits may be used to clean and stabilize output power. Functionally, such conditioning circuits may e.g., regulate voltage, suppress transients, regulate frequencies, filter harmonics, filter noise, convert between voltage/current, etc.

7.3 Other Power Source Considerations

As a brief aside, alternating current (AC) and direct current (DC) are two fundamentally different ways of transmitting and using electrical energy. AC voltage periodically reverses direction. It continuously alternates between positive and negative cycles, creating a sinusoidal waveform. In contrast, DC voltage is unidirectional, meaning it flows in a constant direction from positive to negative terminals. AC is typically used for transmission and distribution because it can be easily transformed into different voltage levels using transformers. It is also used in most household and commercial electrical systems because it is easy to generate and distribute. Conversely, DC circuits are generally simpler; for example, a DC motor can vary speed and provides consistent torque (both of which are difficult to do with AC motors). DC circuits are commonly used in hand tools, electronic devices (like smartphones and laptops), automotive systems, and some specialized applications like solar photovoltaic systems.

In some embodiments, the exemplary flashlight charging system 2600 may incorporate rectifiers, inverters, and/or transformers. A rectifier may be used to convert alternating current (AC) voltage into direct current (DC) voltage. It "rectifies" the AC waveform by allowing current to flow in only one direction. An inverter does the opposite of a rectifier; it "inverts" DC voltage into AC voltage. Inverters generate a sinusoidal or modified sine wave AC output. Transformers can be used to increase (step-up) or decrease (step-down) the voltage level of an AC voltage without changing its frequency.

Transformers have a variety of useful properties. First, transformers may be used to match the voltage of electrical equipment to the available supply voltage. For example, industrial equipment may require a specific voltage level that differs from the standard distribution voltage. Secondly, transformers may be used to match the impedance between two components of a circuit, optimizing power transfer. This is particularly important in audio systems and radio frequency applications. Thirdly, transformers can introduce a controlled phase shift between the input and output voltages. This property is used in various applications, including power factor correction and inductive coupling in electronic circuits.

Another consideration for power sources is recharging functionality. During charging operation, the power subsystems 2616 and 2656 may recharge a battery (converting electrical energy to a chemical potential for storage). The charging process is typically a multi-stage process that e.g., delivers a constant current to the battery until the battery reaches a specified voltage level (a so-called "constant current" stage), deliver a constant voltage until the battery no longer consumes current (a so-called "constant voltage" stage), and maintains a low current to the battery to top-up from self-discharge (a so-called "trickle charge" stage). In some variants, the power subsystems 2616 and 2656 may include a charging circuit that additionally monitors the charging source and destination to ensure that the charging process operates safely (overcharging can damage batteries and/or result in catastrophic failures). In some embodiments, the power subsystems 2616 and 2656 can both provide power, while also concurrently charging. For example, a device that may operate from wall socket power while also using excess power to charge its batteries.

More generally, artisans of ordinary skill in the related arts will readily appreciate that integrating multiple power sources within a single system to service a variety of dynamic loads may require additional supporting circuitry to address these differences. For example, a system may have a transformer to step-down AC power, a rectifier to convert the reduced AC power into DC power, and a charging circuit that manages the battery charging process. As another such example, an inverter may be used to convert DC power to AC power for devices that are usually used with wall outlets.

8 Dock Subsystem

Within the context of the present disclosure, the dock subsystem 2620 of the charging holster 2610 provides a physically couplable electro-mechanical interface to a corresponding dock subsystem 2660 of the flashlight 2650. The following discussions provide several illustrative embodiments of dock subsystems 2620 and 2660, however, artisans of ordinary skill in the related arts given the contents of the present disclosure will readily appreciate that the virtually any control and data logic may be substituted with equal success.

Functionally, the dock subsystems 2620 and 2660 physically connect to one another and allow transfer of e.g., power and/or data. In one embodiment, the dock subsystem of a holster electro-mechanically couples to the dock subsystem of the flashlight.

As used herein, "holster" and its linguistic derivatives refers to an apparatus that can be attached to a user, or their personal effects (belt, waistband, shirt, bag, etc.), and which allows a user to dock, carry, and/or use a device while it is attached to them. More generally, "dock" and its linguistic derivatives refer to any electro-mechanical coupling system that enables the transfer of power and/or data.

In some embodiments, power transfer may incorporate conditioning to compensate for differences between the electrical characteristics of the docked devices. For example, the power subsystems 2616 and 2656 may have different reference ground voltages; this can create a grounding loop if left unchecked. Similarly, an unholstered device may accumulate static, which might damage components during holstering.

In some embodiments, data transfer may incorporate communication, negotiation, and/or security protocols to secure data transfers. As an example, a personal holster may be attached to a user's personal effects and may accumulate certain types of data which may be privileged or otherwise sensitive (e.g., time, location, etc.). The holstering process may require that both devices identify one another before transferring such data, etc.

9 Control and Data Subsystem

Within the context of the present disclosure, the control and data subsystem 2618 of the charging holster 2610 monitors the power subsystem 2616 and/or the load subsystem 2612 and adjusts power provisioning according to the dynamic loading activity of the load subsystem 2612. The control and data subsystem 2658 of the flashlight 2650 monitors the power subsystem 2656 and/or the load subsystem 2652 and adjusts power provisioning according to the dynamic loading activity of the load subsystem 2652.

The following discussions provide several illustrative embodiments of control and data subsystems 2618 and 2658, however, artisans of ordinary skill in the related arts given the contents of the present disclosure will readily appreciate that the virtually any control and data logic may be substituted with equal success.

In one exemplary embodiment, the control and data subsystems 2618 and 2658 may include a processor and a non-transitory computer-readable medium that stores program instructions and/or data. During operation, the processor performs several actions according to a clock. These may be logically subdivided into a "pipeline" of processing stages. For example, one exemplary pipeline might include: an instruction fetch (IF), an instruction decode (ID), an operation execution (EX), a memory access (ME), and a write back (WB). During the instruction fetch stage, an instruction is fetched from the instruction memory based on a program counter. The fetched instruction is provided to the instruction decode stage, where a control unit determines the input and output data structures and the operations to be performed. These input and output data structures and operations are executed by an execution stage. For example, an instruction (LOAD R1, ADDR1) may instruct the execution stage to "load" a first register R1 of registers with the data stored at address ADDR1. In some cases, the result of the operation may be written to a data memory and/or written back to the registers or program counter.

Artisans of ordinary skill in the related arts will readily appreciate that the techniques described throughout are not limited to the basic processor architecture and that more complex processor architectures may be substituted with equal success. Most processor architectures implement e.g., different pipeline depths, parallel processing, more sophisticated execution logic, multi-cycle execution, and/or power management, etc.

As a practical matter, different processor architectures attempt to optimize their designs for their most likely usages. More specialized logic can often result in much higher performance (e.g., by avoiding unnecessary operations, memory accesses, and/or conditional branching). For example, a general-purpose CPU may be primarily used to control device operation and/or perform tasks of arbitrary complexity/best-effort. CPU operations may include, without limitation: best-effort operating system (OS) functionality (power management, UX), memory management, etc. Typically, such CPUs are selected to have relatively short pipelining, longer words (e.g., 32-bit, 64-bit, and/or superscalar words), and/or addressable space that can access both local cache memory and/or pages of system virtual memory. More directly, a CPU may often switch between tasks, and must account for branch disruption and/or arbitrary memory access.

As another example, a microcontroller may be suitable for embedded applications of known complexity. Microcontroller operations may include, without limitation: real-time operating system (OS) functionality, direct memory access (DMA) based hardware control, etc. Typically, microcontrollers are selected to have relatively short pipelining, short words (e.g., 8-bit, 16-bit, etc.), and/or fixed physical addressable space that may be shared with hardware peripherals. Typically, a microcontroller may be used with static/semi-static firmware that is application specific.

Application specific integrated circuits (ASICs) and field-programmable gate arrays (FPGAs) are other "dedicated logic" technologies that can provide suitable control and data processing. These technologies are based on register-transfer logic (RTL) rather than procedural steps. In other words, RTL describes combinatorial logic, sequential gates, and their interconnections (i.e., its structure) rather than instructions for execution. While dedicated logic can enable much higher performance for mature logic (e.g., 50X+ relative to software alternatives), the structure of dedicated logic cannot be altered at run-time and is considerably less flexible than software.

Application specific integrated circuits (ASICs) directly convert RTL descriptions to combinatorial logic and sequential gates. For example, a 2-input combinatorial logic gate (AND, OR, XOR, etc.) may be implemented by physically arranging 4 transistor logic gates, a flip-flop register may be implemented with 12 transistor logic gates. ASIC layouts are physically etched and doped into silicon substrate; once created, the ASIC functionality cannot be modified. Notably, ASIC designs can be incredibly power-efficient and achieve the highest levels of performance. Unfortunately, the manufacture of ASICs is expensive and cannot be modified after fabrication—as a result, ASIC devices are usually only used in very mature (commodity) designs that compete primarily on price rather than functionality.

FPGAs are designed to be programmed "in-the-field" after manufacturing. FPGAs contain an array of look-up-table (LUT) memories (often referred to as programmable logic blocks) that can be used to emulate a logical gate. As but one such example, a 2-input LUT takes two bits of input which address 4 possible memory locations. By storing "1" into the location of 0#b'11 and setting all other locations to be "0" the 2-input LUT emulates an AND gate. Conversely, by storing "0" into the location of 0#b'00 and setting all other locations to be "1" the 2-input LUT emulates an OR gate. In other words, FPGAs implement Boolean logic as memory-any arbitrary logic may be created by interconnecting LUTs (combinatorial logic) to one another along with registers, flip-flops, and/or dedicated memory blocks. LUTs take up substantially more die space than gate-level equivalents; additionally, FPGA-based designs are often only sparsely programmed since the interconnect fabric may limit "fanout." As a practical matter, an FPGA may offer lower performance than an ASIC (but still better than software equivalents) with substantially larger die size and power consumption. FPGA solutions are often used for limited-run, high performance applications that may evolve over time.

9.1 Power Source Selection and Monitoring Logic

Figure 27:
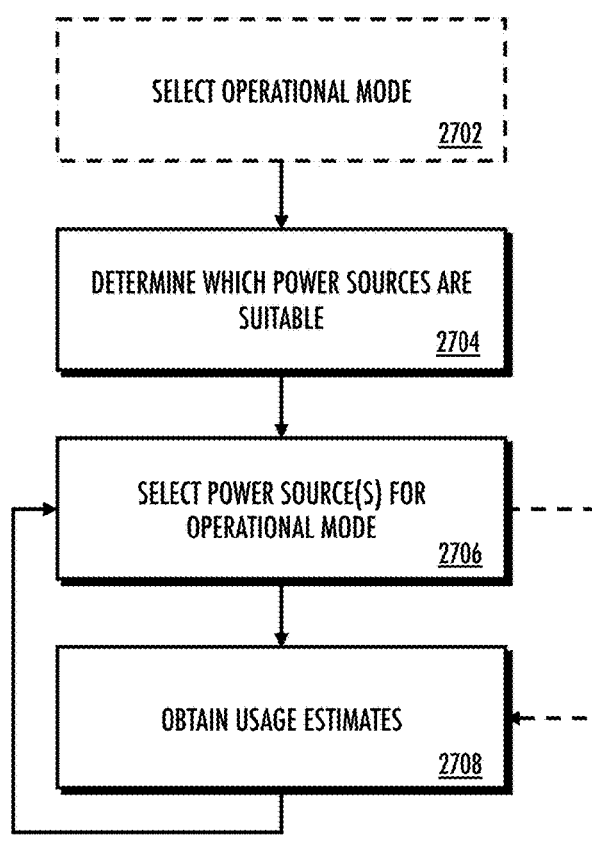
FIG. 27 illustrates logical flow diagrams of methods for power management and monitoring in accordance with the various techniques described herein.
Figure 27:
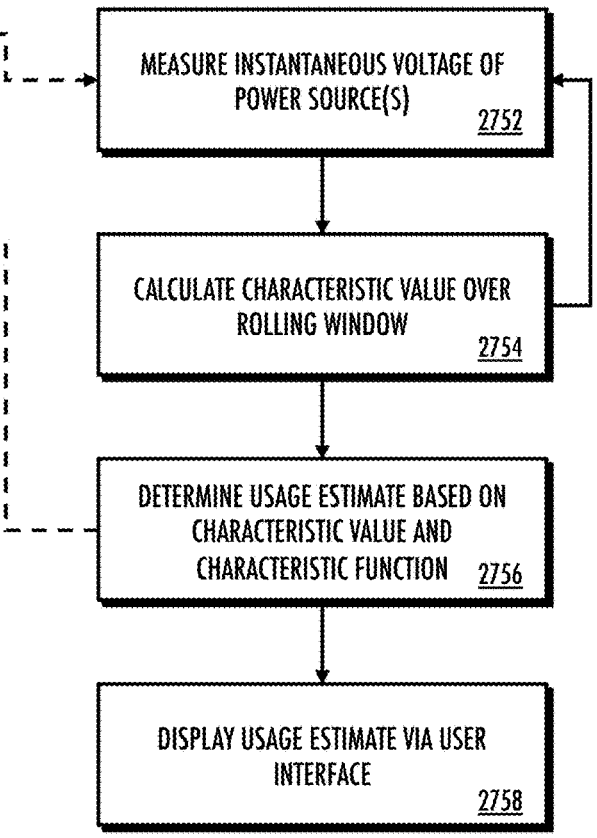

In one exemplary embodiment, data may be stored as non-transitory symbols (e.g., bits, bytes, words, and/or other data structures.) In one specific implementation, the memory subsystem is realized as one or more physical memory chips (e.g., NAND/NOR flash) that are logically separated into memory data structures. The memory subsystem may be bifurcated into program code (e.g., power management instructions 2700, and monitoring instructions 2750 of FIG. 27) and/or program data (not shown). In some variants, program code and/or program data may be further organized for dedicated and/or collaborative use. For example, a microcontroller and hardware driver may share a physical memory buffer to facilitate data transfer without memory indirection. In other examples, a microcontroller may have a dedicated memory buffer to avoid resource contention.

While the following discussion is presented in the context of two separate processes, the processes may be combined into a single process or further subdivided into three or more processes with equal success. Additionally, the following steps are discussed in the context of software instructions stored on memory and executed via a processor, however alternative implementations may use dedicated hardware (combinatorial and sequential logic) and/or firmware (software/hardware hybrids).

Referring now to the power management instructions 2700, a user selects one or more operational modes from a plurality of operational modes (step 2702). As previously noted, operational modes may include lighting modes, charging modes, data transfer/playback modes, and/or any other set of active functions. In some embodiments, the operational modes may be selected based on user selection. For example, a user may manually select between USB charging and/or lighting using switches, buttons, or other user interface components. In other embodiments, the operational modes may be selected based on the power management logic's internal heuristics and/or configuration.

For instance, the power management logic may automatically charge connected devices (e.g., the flashlight 2650), plugged devices (e.g., after USB enumeration procedures, etc.) and/or automatically enable/disable lighting based on motion activation, etc. Accordingly, power management logic may determine the loads needing power including internal loads (e.g., a lighting assembly, indicator LEDs, processing/charging circuitry) and external loads (e.g., a flashlight connected directly via charging contacts, a headlamp connected via a USB connection, etc.). In some cases, the power management logic may prevent certain operational modes—for example, high current drain lighting may disable external charging and/or vice versa.

Power management logic may include detecting and/or monitoring connected (or disconnected) loads. For example, the flashlight 2650 is connected to the charging holster 2610. A physical connection may be detected by various means. For example, the power management logic may detect electrical resistance on pins (e.g., charging contacts on the charging holster 2610) may be measured using a pull-down/pull-up resistor circuit. In a pull-down resistor circuit, a resistor is connected between an input pin (e.g., a charging contact) and the ground (GND) of a microcontroller of the power management logic. When a device (e.g., the flashlight 2650) is not connected, the resistor pulls the input pin to a logic low level (e.g., 0V or ground). This indicates the absence of a connection. When a device is connected (e.g., charging rings of the flashlight 2650 are electrically coupled to charging contacts of the charging holster 2610), an external signal source (e.g., the connected device or a switch) overrides the pull-down resistor's effect, and the voltage at the input pin rises to a logic high level (in some examples, close to the supply voltage, e.g., 3.3V or 5V). In a pull-up resistor circuit, a resistor connects the input pin to the positive voltage. When no device is present, the pull-up resistor pulls the input pin to a logic high level (in some examples, close to the supply voltage, e.g., 3.3V or 5V). This indicates the absence of a connected device. When a device is connected, the external signal source (e.g., the connected device or a switch) overrides the pull-up resistor's effect, and the voltage at the input pin drops to a logic low level (e.g., close to ground).

Additional exemplary implementations may use one or more of the following mechanisms: a physical switch that is flipped when a device is connected, optical sensors that get covered when a device is connected, weight or pressure sensors detect a difference, a change in magnetic fields detected, a hall effect sensor detecting the presence/absence of a magnetic field (due to, e.g., a magnet in the connected device), etc.

At step 2704, the power management logic determines a set of power sources that are suitable for the selected operational mode(s). Determining suitable power sources may include determining the kind, type, and/or charging status of available connected power sources. Power sources may include internal power sources (e.g., internal batteries) or external power sources (e.g., connected devices like the charging holster 2610, a power bank, etc.). Power sources may include, without limitation, dry cell batteries, rechargeable batteries, solar panels, fuel-based generators, fuel cells, piezo-electric cells, "mains" or "wall" power, and/or external power interfaces (e.g., USB, PoE), and/or any other source of electrical power.

In one embodiment, power management logic may be select between single-source or multiple source power supplies. As used herein, the term "single source" refers to a power supply that can select one power source from multiple power sources. For example, so-called "dual power" devices are devices that are designed to accept either single-use or rechargeable cells, but not at the same time. A dual power device may accept one battery cartridge for single-use batteries and another for rechargeable batteries. In another example, a single battery cartridge type can accept either single-use or rechargeable batteries (but not a mix of types). Dual power devices lack the onboard intelligence to manage different cell chemistries; thus, mixing cell types can result in the problems described above (reduced power, damage, and/or rupture). In some situations, dual power devices can also be inconvenient because the consumer may need to carry both options with them and to know in advance what their power needs will be.

As used herein, the term "multiple source" refers to a power supply that can combine power outputs from multiple power sources. For example, "hybrid power devices" may include circuitry that monitors power conditions of the different power sources and may make intelligent power management decisions on how to budget available power for a user of the device. Ideally, hybrid power devices can accommodate different power supplies, flexibly address different usages, and improve the convenience of use. For example, the flashlight 2650 may combine output from multiple power sources (e.g., charging holster 2610 and an internal rechargeable battery). The charging holster 2610 may combine output from multiple power sources (e.g., an internal rechargeable battery and power received via a USB-charging port).

Various embodiments of the present disclosure may limit operational modes to certain suitable power sources. For example, 3 AA or 3 D batteries can both generate up to 4.5V but at different current draws; thus, either power supply may be suitable for certain lighting modes. Similarly, external charging may preferentially use the 3.7V lithium-ion, with a fallback to 3 AA batteries. In some cases, suitability preferences may be used to prioritize/de-prioritize operational modes; for example, the flashlight 2650 may preserve its internal battery when coupled to the charging holster 2610 or via a USB-charging power. In some examples, the charging holster 2610 may use certain power sources (e.g., single use D batteries) for high-intensity loads (e.g., certain lighting applications), devices (e.g., a connected flashlight 2650) or interfaces (e.g., charging contacts), but not others. For example, charging a connected device via a USB interface. In other cases, suitability preferences may enable hybrid operation e.g., 4.5V can be concurrently sourced from AA and D cells without damage—but would result in harmful back current for the 3.7V lithium-ion. In some examples, a 4.5V load can be concurrently sourced from the internal battery and via a (power-in) USB interface. Some implementations may implement usage restrictions as static logic, other implementations may dynamically evaluate suitability based on a variety of factors. Examples of such factors may include e.g., minimum or maximum voltage/current/power requirements, user preferences, history of usage, battery condition, battery hysteresis (memory effects), availability of alternative power supplies, and/or any other operational consideration.

At step 2706, the power management logic selects one or more power sources from the set of power sources for the operational mode. In one exemplary embodiment, the power management logic may select from multiple types of batteries and allow the batteries to be used separately, or concurrently. In another exemplary embodiment, the power management logic may select from powering device operations from connected power sources (e.g., via a USB power-in interface, a connected charging device via charging contacts on the charging holster 2610/charging rings on the flashlight 2650, solar panels, etc.) and an internal battery and allow the various power sources to be used separately, or concurrently. The power management logic may intelligently monitor the availability of the power sources and the power remaining in all power sources; this information may be used to switch between the power sources. Ideally, the power management logic maximizes the power available for the lowest lifetime cost, while also offering the highest flexibility in power options.

For example, power management logic on the flashlight 2650 may monitor available the available charge/battery life in the charging holster 2610 to determine whether to continue to charge the internal battery of the flashlight 2650 (or, e.g., leave remaining power in the battery of the charging holster 2610 to power/charge other, perhaps emergency, components like a cellular phone or headlamp). Power management logic on the charging holster 2610 may monitor the current charge of the battery in the flashlight 2650 and provide less/no power as the battery in the flashlight 2650 becomes fully charged. Determinations of the remaining charge may be provided via a data connection between devices or determined via the requested load.

At step 2708, the power management logic obtains usage estimates from monitoring logic and may select (or re-select) another power source from the set of power sources for the selected operational mode. In some examples, usage estimates may be received from monitoring logic on a connected device.

Referring now to the monitoring instructions 2750, the instantaneous voltage of a power source is measured at step 2752. In one exemplary embodiment, voltage may be measured across a known impedance using an analog-digital conversion (ADC). Impedance based measurements may consider both resistance (frequency independent) and/or reactance (frequency dependent). For example, certain duty cycles and/or sampling frequencies may use frequency-dependent resonance/interference to amplify and/or attenuate measurements. Then, the monitoring logic calculates a characteristic voltage for a rolling window at step 2754.

As used herein, "instantaneous" refers to a specific measurement of a time-varying quantity at a specific time (an instance). "Characteristic" refers to a representative measurement for a time-varying quantity over a window of time. As previously noted, characteristic measurements may include averaging (mean, median, range), filtering, root-mean-square calculations, multiply-accumulate, and/or any other calculation that generates a characteristic non-zero value for a dynamic input.

In some embodiments, the granularity of the instantaneous measurements, the sample rate, and/or the size of the rolling window may be selected to provide a specific granularity. For example, a 4-bit ADC can generate up to 16 different values, an 8-bit ADC can generate up to 256 values. The sampling rate (e.g., 1 Hz (1/sec), 2 Hz (2/sec), . . . 40 Hz (40/sec), etc. affects the relative responsiveness of measurements. Accumulating these values over the rolling window could provide a substantial range of readings (e.g., accumulating 16 measurements could span 256-4096 different possible values over a duration between 200 ms-16 s). In some cases, the granularity may be specific to the operational mode. For example, a high-draw operational mode (e.g., 100% duty cycle light) will use battery power very quickly and may only need gross measurements at a relatively fast sample rate to detect the drop and/or rate of drop. In contrast, a low-draw operational mode (e.g., trickle charging) may need much finer granularity and/or a much slower sample rate to provide meaningful data. In other words, the monitoring logic may adjust its measurement accuracy/precision to suit the power consumption characteristics of the different operational modes.

At step 2756, the monitoring logic determines usage estimates based on the characteristic value and a characteristic function. In one exemplary embodiment, the characteristic function may be a look-up table that provides a correspondence between a characteristic value (e.g., a time averaged voltage measurement taken at a specific duty cycle and sample rate) to an estimated battery life based on the experimentally determined battery chemistry/characteristics. More generally, however, any suitable function may be substituted with equal success. Characteristic functions may be based on piecewise, point-wise, linear approximation, polynomial interpolation, etc.

In some examples, usage estimates (and/or voltage/characteristic values) may be provided to a connected device. For example, the flashlight 2650 may provide usage estimates of an internal battery to a connected charging holster 2610 when charging. The flashlight 2650 may monitor usage of the internal battery and send usage estimates/voltage values/characteristic values to the charging holster 2610. The charging holster 2610 may receive the characteristic value and/or receive the voltage/characteristic values and calculate the characteristic value over a rolling window for power management, monitoring, and/or display.

At step 2758, the usage estimates are displayed via a user interface. Notably, indicator LEDs can represent different usage estimates based on the number lit and color. For example, the charging holster 2610 and flashlight 2650 may each have four indicator LEDs to indicate the draw (or charging) of the state of the internal battery of the device. In another example, the charging holster 2610 may have indicator LEDs to indicate the usage/remaining charge of an internal battery of a connected flashlight 2650 based on receiving usage estimates from the flashlight 2650. Other implementations may use any number of LEDs/colors to represent any number of different power information. More broadly, any scheme for representing usage may be substituted with equal success. For example, a sufficiently capable UI may provide usage estimates in more verbose or granular form e.g., a smart phone interface could provide a text readout with an estimated current draw (in amps/milliamps, etc.) and/or remaining capacity (amp hours, milliamp hours, etc.), or illustrate usage/capacity over time.

10 Additional Configuration Considerations

Throughout this specification, some embodiments have used the expressions "comprises," "comprising," "includes," "including," "has," "having" or any other variation thereof, all of which are intended to cover a non-exclusive inclusion. For example, a process, method, article, or apparatus that comprises a list of elements is not necessarily limited to only those elements but may include other elements not expressly listed or inherent to such process, method, article, or apparatus.

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

As used herein any reference to any of "one embodiment" or "an embodiment", "one variant" or "a variant", and "one implementation" or "an implementation" means that a particular element, feature, structure, or characteristic described in connection with the embodiment, variant or implementation is included in at least one embodiment, variant or implementation. The appearances of such phrases in various places in the specification are not necessarily all referring to the same embodiment, variant or implementation.

As used herein, the term "computer program" or "software" is meant to include any sequence of human or machine cognizable steps which perform a function. Such program may be rendered in virtually any programming language or environment including, for example, Python, JavaScript, Java, C#/C++, C, Go/Golang, R, Swift, PHP, Dart, Kotlin, MATLAB, Perl, Ruby, Rust, Scala, and the like.

As used herein, the term "integrated circuit", is meant to refer to an electronic circuit manufactured by the patterned diffusion of trace elements into the surface of a thin substrate of semiconductor material. By way of non-limiting example, integrated circuits may include field programmable gate arrays (e.g., FPGAs), a programmable logic device (PLD), reconfigurable computer fabrics (RCFs), systems on a chip (SoC), application-specific integrated circuits (ASICs), and/or other types of integrated circuits.

As used herein, the term "memory" includes any type of integrated circuit or other storage device adapted for storing digital data including, without limitation, ROM. PROM, EEPROM, DRAM, Mobile DRAM, SDRAM, DDR/2 SDRAM, EDO/FPMS, RLDRAM, SRAM, "flash" memory (e.g., NAND/NOR), memristor memory, and PSRAM.

As used herein, the term "processor" or "processing unit" is meant generally to include digital processing devices. By way of non-limiting example, digital processing devices may include one or more of digital signal processors (DSPs), reduced instruction set computers (RISC), general-purpose (CISC) processors, microprocessors, gate arrays (e.g., field programmable gate arrays (FPGAs)), PLDs, reconfigurable computer fabrics (RCFs), array processors, secure microprocessors, application-specific integrated circuits (ASICs), and/or other digital processing devices. Such digital processors may be contained on a single unitary IC die or distributed across multiple components.

It will be appreciated that the various ones of the foregoing aspects of the present disclosure, or any parts or functions thereof, may be implemented using hardware, software, firmware, tangible, and non-transitory computer-readable or computer usable storage media having instructions stored thereon, or a combination thereof, and may be implemented in one or more computer systems.

It will be apparent to those skilled in the art that various modifications and variations can be made in the disclosed embodiments of the disclosed device and associated methods without departing from the spirit or scope of the disclosure. Thus, it is intended that the present disclosure covers the modifications and variations of the embodiments disclosed above provided that the modifications and variations come within the scope of any claims and their equivalents.

What is claimed is:

1. A charging holster comprising:
   a housing comprising:
      a power compartment;
      a charging cradle configured to removably couple to a flashlight, the charging cradle comprising:
         side walls forming an open cylinder having a cutout comprising one or more charging contacts electrically coupled to the power compartment and electrically couplable to the flashlight; and
         support arms raised above the side walls disposed at opposing sides of the charging cradle of the charging cradle, the support arms configured to flex to accommodate insertion of the flashlight; and
      a bridge coupling the power compartment and the charging cradle, the bridge comprising a retaining arch and a rim forming an aperture; and
   a clip coupled to the housing.

2. The charging holster of claim 1, a rechargeable battery disposed within the power compartment, the rechargeable battery electrically coupled to the one or more charging contacts.

3. The charging holster of claim 1, where the charging holster is configured to secure a head component of the flashlight between the retaining arch and the side walls.

4. The charging holster of claim 3, where the charging cradle is configured to secure a barrel of the flashlight between the support arms while the flashlight is able to rotate within the charging cradle.

5. The charging holster of claim 1, where the bridge is configured to allow the flashlight to illuminate through the aperture while coupled to the charging cradle.

6. The charging holster of claim 1, where the bridge further comprises a charging assembly electrically coupled to the power compartment and the one or more charging contacts, the charging assembly comprising:
  a printed circuit board (PCB) comprising a microcontroller and a non-transitory computer-readable medium comprising instructions that when executed by the microcontroller, cause the charging holster to:
    monitor a usage of a power source disposed within the power compartment; and
    provide power to the flashlight.

7. The charging holster of claim 6, where:
  the bridge further comprises a plurality of indicator lights, and
  the instructions that when executed by the microcontroller, further cause the charging holster to: display the usage of the power source by illuminating one or more of the plurality of indicator lights.

8. The charging holster of claim 6, where the bridge further comprises a charging port electrically coupled to the charging assembly.

9. The charging holster of claim 1, where the clip comprises:
  a connector plate coupled to the housing; and
  an attachment point configured to affix the charging holster to an item.

10. The charging holster of claim 1, further comprising a power compartment cap removably coupled to the power compartment, the power compartment cap comprising a spring couplable to a rechargeable battery.

11. A charging apparatus, comprising:
  a rechargeable battery;
  a battery compartment housing the rechargeable battery;
  a charging cradle coupled to the battery compartment;
  charging contacts coupled to the charging cradle;
  an attachment device coupled to the battery compartment and the charging cradle;
  charging circuitry electrically coupling the rechargeable battery and the charging contacts;
  a processor electrically coupled to the charging circuitry; and
  a non-transitory computer-readable medium comprising instructions that when executed by the processor, cause the charging apparatus to:
    determine an operational mode of a plurality of operational modes of the charging apparatus;
    determine a flashlight is electrically coupled to the charging apparatus via the charging contacts; and
    providing power to the flashlight, via the charging contacts, based on the operational mode.

12. The charging apparatus of claim 11, further comprising a plurality of indicator light emitting diodes (LEDs) controllable by the charging circuitry, where the instructions that when executed by the processor, further cause the charging apparatus to:
  obtain load parameters of the rechargeable battery based on data received via the charging contacts;
  determine a usage estimate based on at least one measured voltage of the rechargeable battery and a characteristic function of the rechargeable battery; and
  display data based on the usage estimate on the indicator LEDs.

13. The charging apparatus of claim 11, where the plurality of operational modes comprises a first usage mode that disables charging of a flashlight battery of the flashlight while providing power to a lighting device of the flashlight.

14. The charging apparatus of claim 11, where the plurality of operational modes comprises a first usage mode that prioritizes power provided to the flashlight over the rechargeable battery when connected to an external power source.

15. A lighting apparatus charging system, comprising:
  a charging apparatus comprising:
    a clip;
    a first rechargeable battery;
    a battery compartment housing the first rechargeable battery; and
    a charging cradle forming a base with a semi-cylindrical interior portion, the semi-cylindrical interior portion having a cutout comprising a pair of charging contacts, the charging cradle comprising flexible support arms at opposing sides of the charging cradle and a retaining arch forming an aperture; and
  a lighting apparatus, removably coupled to the charging apparatus, the lighting apparatus comprising:
    a head component comprising a lighting assembly, a first portion of the head component disposed between the cutout and the retaining arch of the charging cradle; and
    a barrel coupled to the head component and disposed between the base and the flexible support arms of the charging cradle, the barrel comprising:
      a second rechargeable battery electrically coupled to the lighting assembly; and
      electrical contacts, the electrical contacts electrically coupled to the second rechargeable battery and the charging contacts of the charging cradle.

16. The lighting apparatus charging system of claim 15, where:
  the electrical contacts comprise metallic charging rings disposed along a circumference of the barrel, and
  the lighting apparatus is removably secured to the charging cradle and able to rotate freely about a central axis of the barrel.

17. The lighting apparatus charging system of claim 15, where the lighting apparatus comprises:
  a power switch;
  a mode switch;
  a processor; and
  a non-transitory computer-readable medium comprising instructions that when executed by the processor, cause the lighting apparatus to:
    manage power to the lighting assembly of the lighting apparatus based on a first toggle of the power switch; and
    change an operational mode of a plurality of operational modes on the lighting apparatus based on a second toggle of the mode switch.

18. The lighting apparatus charging system of claim 17, where the lighting apparatus comprises an end cap removably coupled to the barrel opposite the head component, the end cap comprising the power switch and the mode switch, where, when the lighting apparatus is coupled to the charging apparatus:
  the power switch and the mode switch are accessible to user input, and
  the lighting assembly is configured to shine light through the aperture of the charging cradle.

19. The lighting apparatus charging system of claim 15, where the charging apparatus further comprises:
  a charging port configured to receive power from an external power source;
  a processor; and
  a non-transitory computer-readable medium comprising instructions that when executed by the processor, cause the charging apparatus to:
    determine available power sources of the charging apparatus;
    monitoring power loads of the charging apparatus, the power loads comprising a first load associated with the lighting apparatus and a second load associated with the first rechargeable battery;
    selecting one or more power source of the available power sources based on the power loads; and
    providing power to the power loads from the one or more power source.

20. The lighting apparatus charging system of claim 15, where:
  the charging apparatus further comprises:
    a first set of indicator lights;
    a first processor; and
    a first non-transitory computer-readable medium comprising first instructions that when executed by the first processor, cause the charging apparatus to:
      determine a first usage estimate of the first rechargeable battery; and
      display the first usage estimate on the first set of indicator lights; and
  the lighting apparatus further comprises:
    a second set of indicator lights;
    a second processor; and
    a second non-transitory computer-readable medium comprising second instructions that when executed by the second processor, cause the lighting apparatus to:
      determine a second usage estimate of the second rechargeable battery; and
      display the second usage estimate on the second set of indicator lights.

* * * * *